(12) United States Patent
Domingues et al.

(10) Patent No.: US 7,579,030 B2
(45) Date of Patent: Aug. 25, 2009

(54) FOOD PRODUCTS WITH BIOCONTROL PRESERVATION AND METHOD

(75) Inventors: David J. Domingues, Plymouth, MN (US); John H. Hanlin, Maple Grove, MN (US)

(73) Assignee: General Mills Cereals, LLC., Minneapolis, MN (US)

( * ) Notice: Subject to any disclaimer, the term of this patent is extended or adjusted under 35 U.S.C. 154(b) by 867 days.

(21) Appl. No.: 10/771,859

(22) Filed: Feb. 3, 2004

(65) Prior Publication Data

US 2004/0156952 A1 Aug. 12, 2004

Related U.S. Application Data

(62) Division of application No. 09/277,627, filed on Mar. 26, 1999, now Pat. No. 6,692,779.

(51) Int. Cl.
*A23L 3/00* (2006.01)

(52) U.S. Cl. ............................ 426/61; 426/98; 426/327; 426/335; 426/532

(58) Field of Classification Search ...................... 426/7, 426/20, 43, 52, 56, 61, 98, 106, 128, 330.5, 426/323, 326, 327, 335, 384, 407, 412, 471, 426/520, 521, 532
See application file for complete search history.

(56) References Cited

U.S. PATENT DOCUMENTS

| | | | |
|---|---|---|---|
| 4,552,772 A | 11/1985 | Saitoh et al. | 426/557 |
| 4,597,976 A | 7/1986 | Doster et al. | 426/325 |
| 4,599,238 A | 7/1986 | Saitoh et al. | 426/557 |
| 4,659,576 A | 4/1987 | Dahle et al. | 426/324 |
| 4,734,291 A | 3/1988 | Raffensperger | 426/325 |
| 4,828,852 A | 5/1989 | Hsu et al. | 426/94 |
| 4,888,171 A | 12/1989 | Okonogi et al. | 424/93 |
| 4,950,489 A | 8/1990 | Spiller | 426/18 |
| 5,057,330 A | 10/1991 | Lee et al. | 426/120 |
| 5,186,962 A | 2/1993 | Hutkins et al. | 426/61 |
| 5,332,587 A | 7/1994 | Howard et al. | 426/128 |
| 5,480,641 A | 1/1996 | Casas-Perez | 424/93.45 |
| 5,562,938 A | 10/1996 | Lee et al. | 426/106 |
| 5,645,877 A | 7/1997 | Gaier | 426/56 |
| 5,759,596 A | 6/1998 | Domingues et al. | 426/8 |
| 6,022,568 A | 2/2000 | Lesens et al. | 426/61 |
| 6,692,779 B2 * | 2/2004 | Dominques et al. | 426/61 |

FOREIGN PATENT DOCUMENTS

WO WO98/09535 12/1998

OTHER PUBLICATIONS

Franjione et al., The art and science of encapsulation, Summer 1995, Technology Today, printed from http://www.swri.org/3pubs/ttoday/summer95/microeng.htm.*
"The Beneficial Role of Microorganisms in the Safety and Stability of Refrigerated Foods," Hanlin, et al., Chilled Foods, A Comprehensive Guide, 1992, pp. 229-259.
"Biological Competition as a Preserving Mechanism," Gombas, Journal of Food Safety 10, 1989, pp. 107-117.
"Clostridium Botulinum and the Safety of Refrigerated Processed Foods of Extended Durability," Peck, Trends in Food Science & Technology, Jun. 1997, vol. 8, pp. 186-192.
"Factors to be Considered in Establishing Good Manufacturing Practices for the Production of Refrigerated Foods," Moberg et al., Dairy and Food Sanitation, Jun. 1988, vol. 8, No. 6, pp. 288-291.
"Inhibition of Botulinum Toxin Formation in Bacon by Acid Development," Tanaka et al., Journal of Food Protection, Jun. 1980, vol. 43, No. 6, pp. 450-457.
"Inhibition of Botulinum Toxin Production by *Pediococcus acidilactici* in Temperature Abused Refrigerated Foods," Hutton et al., Journal of Food Safety 11, 1991, pp. 255-267.
"Plant Trials of Bacon Made with Lactic Acid Bacteria, Sucrose and Lowered Sodium Nitrite," Tanaka et al., Journal of Food Protection, Aug. 1985, vol. 48, No. 8, pp. 679-686.
"Role of Starter Culture Bacteria in Food Preservation," Gilliland, Bacterial Starter Cultures for Foods, CRC Press, 1985, pp. 173-185.
"Sensory Characteristics of Reduced Nitrite Bacon Manufactured by the Wisconsin Process," Tanaka et al., Journal of Food Protection, Aug. 1985, vol. 48, No. 8, pp. 687-692.
"Studies on Growth and Toxin Production of *Clostridium botulinum* in a Precooked Frozen Food," Saleh et al., Food Research, Jul.-Aug. 1955, vol. 20, No. 4, pp. 339-350.
"Using Lactic Acid Bacteria to Improve the Safety of Minimally Processed Fruits & Vegetables," Breidt et al., FoodTechnology, Sep. 1997, vol. 51, No. 9, pp. 44-51.
Raccach, et al., 1979, Bacterial Repressive Action of Meat Starter Culture in Pasteurized Liquid Whole Egg, 90-92.

* cited by examiner

*Primary Examiner*—Leslie Wong
(74) *Attorney, Agent, or Firm*—Dale Bjorkman; Kimberly Zillig; Annette M. Frawley

(57) ABSTRACT

Food products can include dried microorganisms as a biocontrol agent. The dried cultures resist inactivation during pasteurization of the food product. The microorganisms are selected to be nontoxic and to inhibit growth of pathogenic microorganisms. For example, the biocontrol microorganisms can produce acid to lower the pH of the product thereby inhibiting the growth of pathogens.

28 Claims, 11 Drawing Sheets

FOOD PRODUCTS WITH BIOCONTROL PRESERVATION AND METHOD

This application is a divisional of application Ser. No. 09/277,627, filed on Mar. 26, 1999, now U.S. Pat. No. 6,692,779, the entire disclosure of which is hereby incorporated by reference.

FIELD OF THE INVENTION

The present invention relates to preserved food products and to methods of preservation. In particular, the invention relates to the use of biocontrol approaches for the preservation of food products such as heat-treated food products.

BACKGROUND OF THE INVENTION

Preservation of food products can be achieved using a variety of approaches. Physical manipulations of food products that have a preservative effect include, for example, freezing, refrigerating, cooking, retorting, pasteurizing, drying, vacuum packing and sealing in an oxygen-free package. Some of these approaches can be part of a food processing operation. Food processing steps preferably are selected to strike a balance between obtaining a microbially-safe food product, while producing a food product with desirable qualities.

Furthermore, additives can be combined with the food product as preservatives. Although some food additives can be effective at providing a microbially safe food product, some consumers disfavor added non-natural chemical preservatives. Some chemical preservatives such as citric acid and lactic acid are perceived to be natural and correspondingly more desirable. Some natural preservatives may be effective at providing a microbially safe food product, but at sufficient concentrations to be effective, they can adversely affect the taste and texture of many food products, such as dough products and alimentary pastes.

Due to the time constraints of modern life, there is an increasing demand for high quality food products that are simple to prepare. To produce some of the preferred products, certain effective and long used preservation techniques such as drying may not be desirable. Generally, these food products are preserved by refrigeration. Also, the products generally are pasteurized prior to or at the time of packaging. Thus, a suitable combination of preservation methods include a heating step and a subsequent refrigeration step.

Even though certain food products are pasteurized, certain toxic bacteria form spores that resist destruction by pasteurization. In addition, to reduce the oxidation of the food during storage, the food generally is stored in the absence of oxygen. Many toxic, spore forming bacteria are obligate anaerobic or functional anaerobes.

While refrigeration generally is an effective preservation approach, the products are vulnerable to mishandling in the form of temperature abuse or packaging abuse. In particular, temperature abuse resulting from an improper storage temperature can result in the growth of harmful bacteria from spores. Subsequent proliferation of the harmful bacteria can cause illness to the consumer if the product is later consumed. If the products are subjected to temperature abuse, the growth of harmful bacteria may or may not produce visible signs of spoilage.

Thus, the quality of the product consumed by the ultimate consumer depends on circumstances beyond the control of the producer. In particular, the wholesale and retail distributors should store the products under properly refrigerated conditions. Similarly, the consumer should store and prepare the product in the prescribed manner prior to consumption. Since the products are subject to improper handling, many commercial food products include an added food preservative, to further assure the microbial safety of the food product after it has been manufactured and leaves the control of the manufacturer.

While toxic bacteria are to be avoided, certain bacteria are nontoxic or even beneficial. These nonpathogenic microorganisms form the basis of biocontrol preservation, another type of food preservation system. Biocontrol preservation generally describes the use of nonpathogenic microorganisms and/or their products to inhibit or control pathogenic or toxin-producing microorganisms in food products. Thus, the selected microorganisms replace added chemical preservatives.

The most familiar form of biocontrol preservation is found in fermented food products, such as yogurt. The microorganisms used to ferment yogurt provide not only the desired taste and texture of yogurt but also produce metabolites that inhibit the growth of other microorganisms.

The use of biocontrol preservation also can be used in non-fermented foods, such as milk, meat and meat products, fruits, vegetables and liquid whole eggs. In a fermentation process, a selected microorganism assists with the production of the food product. For example, see Tanaka et al., "Plant Trials of Bacon Made with Lactic Acid Bacteria, Sucrose and Lowered Sodium Nitrite," Journal of Food Protection, 48:679-686 (August 1985). In other forms of biocontrol preservation, the effects of the added microorganisms can be observed only if the food product has been subjected to temperature or other abuse.

Nonharmful bacteria useful for biocontrol preservation, however, generally do not form spores. Therefore, the desirable bacteria generally are killed during a pasteurization or cooking process. As a result, a pasteurization/cooking step tends to eliminate the nonharmful bacteria while allowing for the possible survival of a small number of potentially harmful spore forming bacteria.

SUMMARY OF THE INVENTION

In a first aspect, the invention pertains to a food product comprising a hydrated edible food item and a quantity of dry, nontoxic microorganisms.

In another aspect, the invention pertains to a food product comprising a pasteurized food item and live cultures of nontoxic bacteria sealed within a container in an anaerobic environment.

In another aspect, the invention features a method of preserving a food product comprising heating the food product, the food product comprising dried microorganisms.

BRIEF DESCRIPTION OF THE DRAWINGS

FIG. 18 is a plot of pH of a 10% slurry of a pasta sauce as a function of the number of days that the pasta sauce was stored at 80° F. for four different biocontrol starter cultures and two controls.

FIG. 19 is a plot of pH of a 10% slurry of a pasta sauce as a function of the number of days that the sauce was stored at 50° F. for samples inoculated with four different biocontrol starter cultures.

DETAILED DESCRIPTION OF THE PREFERRED EMBODIMENTS

Figures 1, 2, 3:
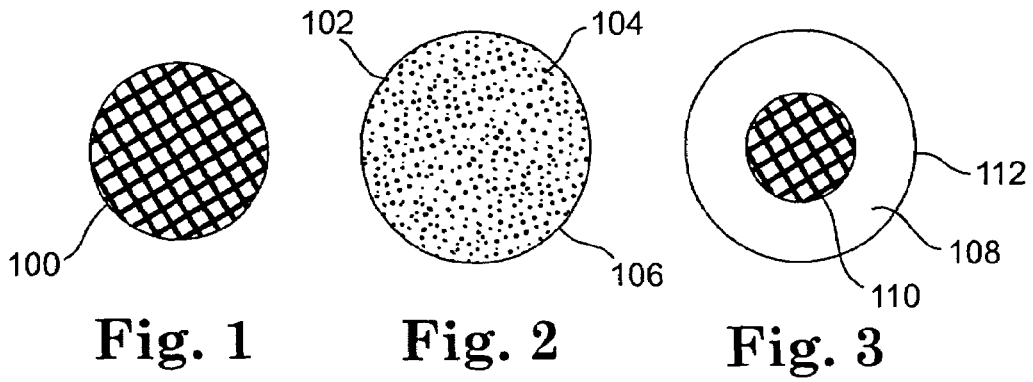
FIG. 1 is a sectional view of a dried culture compressed into a tablet.
FIG. 2 is a sectional view of a dried culture mixed with an encapsulation material and formed into a tablet.
FIG. 3 is a sectional view of a tablet with a dried culture surrounded by an encapsulation material.

Based on approaches for maintaining viable nonharmful bacteria, food products can be produced that are protected against potentially harmful microbial growths. In particular, dried bacteria are used in formulating biocontrol agents such that at least a portion of the dried bacteria remain sufficiently dry during cooking and/or pasteurization processing of the food. In dried form, the bacteria are much less susceptible to inactivation by the heat. Bacteria are considered dry herein if they have a moisture (water) content of less than about 15 percent by weight water. Dried bacteria preferably have from about 0 to about 10 percent by weight water and more preferably from about 0 to about 6 percent by weight water. It has further been discovered that a starter culture of an acid producing bacteria can be sprayed onto a refrigerated, stuffed pasta product prior to packaging to protect the product against pathogens if the product is subjected subsequently to temperature abuse.

The inoculated microorganisms form a starter culture for the growth of and acid production by the selected microorganisms within the food product under conditions that permit the growth of potentially harmful organisms. For certain embodiments, the inoculated cultures preferably begin dry. Upon mixing with the food product, the starter cultures generally begin hydrating. The pasteurization generally is performed prior to complete hydration. In preferred embodiments, the bacterial cultures are encapsulated to slow the hydration process.

For the added microorganisms to be effective at biopreservation, some microorganisms must survive the food preparation process. If a heating step is involved in the food preparation, the microorganisms can be added after the food product has cooled below pasteurization temperatures, but this may not be acceptable since the food may be packaged while hot to discourage the presence of pathogenic organisms within the food product and to keep out air and other potential sources of contaminants. For these embodiments, the selected microorganisms generally have to be protected from inactivation by the heat processing of the food product prior to a packaging step. It has been discovered that the preservation of the desired microorganisms can be promoted by maintaining at least a portion of the microorganisms dry during periods when the added cultures are subjected to high temperatures.

In alternative embodiments, filled dough products, described further below, are sprayed with a liquid starter culture prior to packaging. The application is performed at temperatures ranging from ambient to refrigeration temperatures. It has been found that the bacteria applied in this way are surprisingly effective to lower the pH of both the dough and the filling upon temperature abuse. Thus, the starter culture can be added after the pasteurization of the product while maintaining the ability to control effectively pathogen growth subsequent to packaging.

The microorganisms for inoculation into the food products in the form of a biocontrol agent are selected from microorganisms that generally are safe for human consumption and, therefore, safe for use in food. Furthermore, the microorganisms should be useful in the inhibition of the growth of at least certain harmful microorganisms. In particular, the bacteria are selected such that they will successfully inhibit the growth of potentially pathogenic or toxin producing bacteria if the food product is temperature abused. Temperature abuse involves subjecting the product to a temperature outside of the suggested storage temperature range for a sufficient period of time so that the temperature of a significant portion of the product is outside of the suggested temperature range. Alternatively, the selected bacteria may render the food product unpalatable without rendering the product harmful if the added microorganisms grow due to temperature abuse of the product.

The growth of the selected microorganisms helps to inhibit the growth of pathogenic organisms also because of competition. Preferably, the selected microorganisms produce by-products that inhibit the growth of harmful microorganisms. For example, the inoculated microorganisms can produce acid or antibiotic compounds. Acid-producing microorganisms inhibit harmful microbial growth by producing organic acid compounds and lowering the pH of the food product. Preferred microorganisms inhibit the growth of harmful microorganisms by organic acid production resulting in the lowering of the pH within the food product during period of temperature abuse. Antibiotic-producing microorganisms can be selected to produce antibiotics which are useful against particular harmful organisms without being particularly toxic to the inoculated microorganisms.

1. Food Products

In general, the processes described herein can be applied to any food product. Specifically, a biocontrol agent can be added to a food product such that inoculated nontoxic bacteria inhibit potentially harmful bacteria. The biocontrol approaches described herein are particularly beneficial for the biopreservation of liquid or moist food products since these products are most susceptible to microbial growth associated with temperature and/or package abuse.

In particular, the biocontrol preservation approaches described herein can be used effectively in the preservation of liquid or moist food products that involve a heating step in their preparation. Liquid or moist food products tend to be preserved by cooking or pasteurization to kill or reduce the microbial load in the product. Pasteurization generally involves the use of moderate heating temperatures (about 65° C. to about 95° C.) for varying lengths of time sufficient to kill most of the vegetative microbes present in the foods. Generally, a target result for a pasteurization process consists of a 6 log (i.e., a factor of $10^6$) reduction in the load of a particular pathogen. Pasteurization generally does not alter significantly the qualities of the food product beyond decreasing the microbial flora. Cooking, on the other hand, generally is designed to purposefully alter the food product to produce a desired modification in the product. Cooking generally involves higher temperatures with cooking times being selected to yield the desired modification of the food product.

A variety of liquid products can be treated by the biocontrol processes including pasteurized and cooked products. Pasteurized liquid food products include, for example, juices, dairy products, other beverages and cooked food products. Liquid food products can include solids suspended within the liquid.

Moist prepared foods can be preserved by freezing. Some consumers, however, have a preference for refrigerated food products because of their ease of storage and preparation. A variety of prepared foods can be sold as refrigerated products including, for example complete meals with multiple courses or individual types of prepared foods of any of a variety of types. Moist food products of particular interest include, for example, filled dough products such as egg rolls, ravioli and the like. To preserve filled dough products from pathogenic microbes, the biocontrol agents can be placed within the fillings of the filled dough products since the filling has the highest moisture levels. Alternatively, the topical application of an aqueous suspension of lactic acid bacteria to the outside of the filled dough product can provide effective acidification of both the dough covering and filling upon temperature abuse of the product, as described in the Examples below. Thus, the biocontrol agent can be sprayed on the outside of the dough product prior to packaging, in addition to or as an alternative to adding the biocontrol agent to the filling.

2. Biocontrol Agents

The biocontrol agents include selected microorganisms, optionally, with additional agents to control the hydration and/or release of the microorganisms within the food product. Selected microorganisms for forming biocontrol agents for incorporation into the food products described above generally are intended to proliferate, i.e., to become metabolically active and produce acid and/or antibiotics, only upon temperature abuse of the product. The added microorganisms can be in a dried state when added to the food product. The inoculated microorganisms (i.e., inoculants) form a starter culture within the food product if conditions provide for the proliferation and acid and/or antibiotic production of the microorganisms.

For certain embodiments, the inoculants preferably are prepared for use in a biocontrol agent by drying a culture of the selected microorganisms. Efficient preparation of the dried cultures involves freeze drying methods such as approaches used to prepare freeze dried food products. As demonstrated in the examples below, maintaining the inoculants dry helps the microorganisms survive heating processes involved in the food preparation or pasteurization.

If the hydration of the dried cultures is sufficiently slow, the biocontrol agent can involve dried cultures without further binding or encapsulation. The dried cultures can be added immediately before, during or after a heating step to control the length of time that the cultures are subjected to the elevated temperatures. To slow the hydration, the dried started cultures can be compressed to form a biocontrol agent initially in a solid shape 100, as shown in FIG. 1. Such a compressed culture can take any shape.

Generally, the starter culture whether encapsulated or not can be added in one or more small pieces of material. Multiple portions of dried starter culture can be distributed through the food product prior to hydration. Single pieces of dried starter culture can be effective since hydrogen ions have been found to migrate effectively through many food products leading to a pH drop in the product. In particular, the pieces of the biocontrol agents preferably have a length less than about 7 mm and, more preferably, less than about 5 mm.

To further slow the hydration of the dried cultures, binding or encapsulation materials can be used along with the dried microorganisms in forming the biocontrol agent. In one use of encapsulation materials, the dried starter cultures are mixed with the encapsulation material. The mixture of encapsulation material 102 and dried culture 104 can be formed into a biocontrol agent such as a tablet 106, as shown in FIG. 2. Alternatively, the binding or encapsulation material can be used to coat the dried starter culture. Referring to FIG. 3, the encapsulation material 108 surrounding the dried starter culture 110 can be formed into solid biocontrol agent such as a tablet 112.

Figure 4:
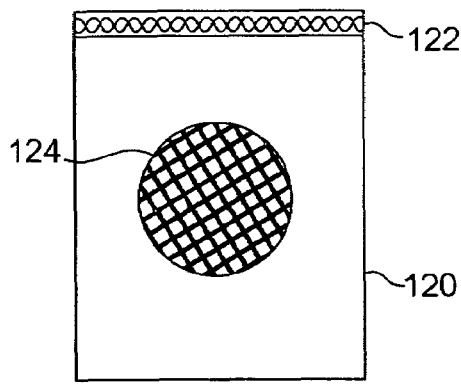
FIG. 4 is a sectional view of a dried culture within a sachet formed of an encapsulation material.

For certain encapsulation materials, the encapsulation material can be formed into a shape with a sealable opening into which the dried cultures can be placed. For example, referring to FIG. 4, the binding or encapsulation material can be formed into a sachet or bag 120 that is closed by a seal 122 after the starter cultures 124 are placed inside. Such a sachet preferably has a length from about 0.5 cm to about 3 cm and more preferably from about 1 cm to about 2 cm.

The selection of the encapsulation material for a particular application can be significant. The encapsulation material should dissolve or degrade such that the inoculants are released into the food product and hydrated prior to any temperature abuse of the product. The hydrated inoculants distributed within the food product are available for biopreservation if needed. Thus, the biocontrol agent should hydrate sufficiently to be effective as a biocontrol agent after any pasteurization or thermal processing steps are completed.

While the encapsulation material must release the inoculants appropriately, the encapsulation material should preserve at least a portion of the inoculant in a dry state during periods where the inoculants are subjected to pasteurization temperatures. The encapsulation material provides a barrier to the contact of water with at least a portion of the inoculated microorganisms. A portion of the inoculants may be destroyed or inactivated during the heating process as long as a sufficient quantity are viable at the completion of the pasteurization/packaging process. A sufficient quantity of viable microorganisms are capable of inhibiting the growth of potentially dangerous microorganisms.

In summary, the binding agent/encapsulation material preferably dissolves or melts in response to moisture or heat such that after a sufficient period of time the dried culture comes in contact with the hydrated food and becomes hydrated itself. The rate of release of the biocontrol culture should protect the dried culture from hydration when subjected to pasteurizing heat but release the biocontrol culture shortly after completion of the heating step. Preferably, the biocontrol agent is released within about 4-7 days after packaging.

The binding agent/encapsulation material must be nontoxic in the quantities introduced into the food product. Also, the encapsulation material should not alter detrimentally the taste, appearance and texture of the food product. A variety of products can be used as the encapsulation material. For example, the encapsulation material can be a food product itself.

In particular, a variety of fats and hydrogenated oils can be used. These fats and oils can be selected and applied in such a fashion that the dried bacteria are not exposed to moisture upon pasteurization. Suitable fats and oils include, for example, hydrogenated vegetable oils, hydrogenated waxes and shortenings made from mono-, di-, or triglycerides. Similarly, other food products can be used such as gelatin, carbohydrates, gums, hydrocolloids, sugars, proteins, and other hydrocarbons such as starch. These can be selected to dissolve after an appropriate period of time subsequent to pasteurization.

Other nontoxic polymers are used for food production and/or drug packaging. Suitable polymers include natural and synthetic polymers. These polymers are intended for consumption and can be safely used as encapsulation materials. Suitable polymers include, for example, various methyl cellulose materials, such as hydroxy propyl methyl cellulose (HPMC). In some embodiments, the encapsulation material further includes an emulsifier. HPMC can slow the hydration of an encapsulated starter culture. HPMC has the further advantage of forming a gel (or region of localized high viscosity) upon hydration at low temperatures, which keeps the microorganisms from dispersing. At temperatures above about 50° F. (10° C.), the HPMC softens/dissolves and releases the microorganisms. Isolation of the microorganisms in a gel helps the product tolerate slight temperature variations without inducing significant activity of the biocontrol agent.

In alternative embodiments, the biocontrol agent is an aqueous suspension of bacteria that are sprayed onto a food product. Sufficient aqueous suspension generally is applied such that the stuffed pasta produce has greater than about $10^2$ CFUs per gram of product, and preferably from about $10^3$ to about $10^5$ CFUs per gram of product, and more preferably from about $10^3$ to about $10^4$ CFUs per gram of product. While larger numbers of bacteria are effective at the prevention of proliferation of pathogenic organisms, they may lower the pH of properly stored products more than desired. Preferably, temperature sensitive strains of microorganisms are used in the preparation of the starter cultures, in which the temperature sensitive strains do not produce acid at slightly elevated refrigeration temperatures that do not present significant risk of contamination from pathogenic microorganisms. When preferred temperature sensitive strains of microorganisms are used, the initial concentration of starter culture applied to the food product has no effect on pH upon exposure to slightly elevated refrigeration temperatures, i.e., about 10° C. (50° F.). Preferred starter cultures exhibit little or no acid production at temperatures less than or equal to about 10° C. (50° F.).

The bacteria can be suspended in, for example, water or buffered aqueous solution. Dextrose or other sugars can be added as a carbon source to the suspension, although generally added sugar is not needed for bacterial metabolism upon temperature abuse. The suspension generally is prepared under sterile conditions to avoid contamination with undesired microorganisms.

Figure 5:
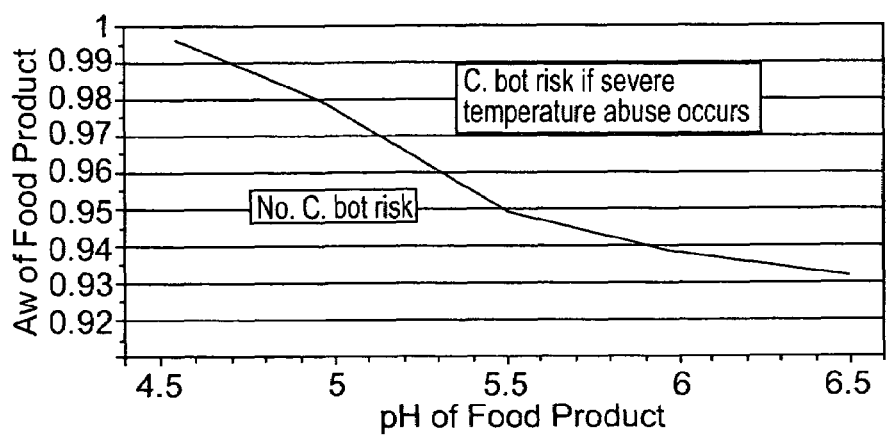
FIG. 5 is an approximate plot of the range of pH values of a food product that are safe from risk of *Clostridium botulinum* for particular values of water activity.

Selected microorganisms preferably produce organic acids such as (but not limited to) lactic acid, acetic acid and/or propionic acid. The lowering of the pH of a sample can inhibit the proliferation of potentially harmful microorganisms such as *Clostridium botulinum*. The pH value that effectively inhibits harmful microorganisms is a function of the amount of available water present (water activity, Aw) in the product system. Safe values of pH for inhibition of *Clostridium botulinum* contamination are shown in FIG. 5 for a range of moisture content in the food product. More acidic pH's are required if the food product has a higher water activity. Water activity can be determined as $a_w = p/p_0 = ERH/100$, where p is the partial pressure of water above a sample, $p^0$ is the vapor pressure of pure water at the same temperature, ERH is the equilibrated relative humidity (%) surrounding the product.

For most food applications, preferred microorganisms for the biocontrol agents do not begin to reduce the pH significantly until the temperature increases to values greater than about 50° F. (10° C.) Thus, under conditions of mild temperature variations, for example, 41° F. to 50° F., the biocontrol agents will not significantly grow. The biocontrol agent preferably does not reduce the pH of the food product or grow unless the product is temperature abused by inadvertently allowing the product to reach a temperature above 50° F. (10° C.).

Six genera of bacteria are known to include species/strains that produce lactic acid and, in some cases, acetic acid. These genera are *Lactococcus, Streptococcus, Leuconostoc, Pediococcus, Lactobacillus* and *Bifidobacterium*. Bacteria from the *Lactobacillus* and *Pediococcus* genuses are particularly suitable for applications where a pH reduction is not desired at temperatures below 50° F. (10° C.). Also, Propionibacterium are capable of making propionic acid and acetic acid. Microorganisms of particular interest include, for example, *Pediococcus acidilactici, Lactobacillus bulgaricus, Lactobacillus plantarum, Lactobacillus acidophilus, Lactobacillus helveticus, Lactobacillus salivarious, Lactobacillus fermentum, Leuconostoc citrovorum, Streptococcus cremoris, Streptococcus diacetylactis, Streptococcus lactis*. Particularly preferred microorganisms include, for example, *Lactobacillus*

*acidophilus, Lactobacillus helveticus, Lactobacillus salivarious, Pediococcus acidilactici, Lactobacillus plantarum* and *Lactococcus lactis.*

The particular strain of microorganism can be selected to be particularly effective to inhibit expected contaminating microorganisms if information is available regarding potentially harmful microorganisms that may be present. For example, the selection of the inoculant should provide for the growth of the selected microorganisms to inhibit the growth of pathogenic microorganisms at the same conditions at which the potentially harmful microorganisms would be expected to proliferate. In particular, the selected microorganism preferably exhibits growth and acid production over a similar temperature range in which the potentially harmful organisms proliferate.

In addition, the selected microorganisms may produce other compounds that have antimicrobial effectiveness against certain pathological strains. In particular, some lactic acid bacteria are known to produce 2, 3 butanedione (diacetyl) which inhibits the growth of, for example, *Enterobacter aorogenes, Escherichia coli, Pseudomonas s.p., Salmonella spp.*, and *Staphylococcus aureus*. Similarly, other lactic acid bacteria produce hydrogen peroxide, which can inhibit some pathogenic microbes at relatively low concentrations. Also, other lactic acid bacteria secrete antibiotic proteins/peptides or other compounds such as nisin. Nisin effectively inhibits *Clostridium botulinum.*

With respect to the use of dried cultures, dried cultures without encapsulation can be especially useful for pasteurization processes, which may involve relatively short periods of heating. For pasteurization processes that may only involve heating for a few seconds to a few minutes, the encapsulation material preferably dissolves relatively quickly after the heating step. For cooked products, the dried culture material with or without encapsulation can be added near the end of the cooking process, after the cooking process is completed, or during an initial cooling period. Following pasteurization or following addition of a biocontrol agent to a cooked product, the food product can be cooled quickly to control the amount of time that the dried culture is subjected to heat.

The size of the inoculum depends on the survival rate of the inoculated cultures following any heat pasteurization. A sufficient number of cells of the starter culture should remain viable such that the added microorganisms can inhibit the growth of potentially harmful organisms by modifying the environment and/or by out-competing the pathogens. Generally, following heating, the food product preferably contains from about $10^2$ colony forming units (CFU)/gm to about $10^{10}$ CFU/gm and more preferably from about $10^3$ CFU/gm to about $10^8$ CFU/gm, and even more preferably from about $10^4$ CFU/gm to about $10^6$ CFU/gm.

In practice, the inoculum size can be selected such that the pH of the food product is lowered sufficiently quickly to prevent the proliferation of pathogenic organisms without lowering the pH significantly under proper refrigeration conditions. The characteristics of the food product including water content, amount of salt and the like influence suitable inoculum size, which can be evaluated empirically based on the disclosure herein.

As noted above, other approaches can be used as an alternative or in addition to maintaining the starter cultures dry. For example, the biocontrol agent in the form of an aqueous suspension can be sprayed over the product before packaging. Still other embodiments involve the use of heat resistant microorganisms. For example, one can use suitable organisms such as *Streptococcus thermophilous* that have natural heat resistance to form the starter cultures. Furthermore, the starter cultures can be prepared from cultures grown at elevated temperatures. Alteration of the membrane composition of microorganisms grown at higher temperatures can enhance the survival chances of the organisms during a subsequent heating process.

3. Food Preparation

The biocontrol agents are designed for incorporation into a set of food preparation steps. In particular, biocontrol agents can be formulated such that they will remain sufficiently viable following contact with some thermal processing (pasteurization) heat. In general, certain preferred embodiments of the overall process involve preparation of the food product, adding in the biocontrol agent, completing any remaining formation of the product, pasteurization, packaging and cooling to refrigeration temperatures. In alternative embodiments involving the application of a bacterial suspension to the surface of a food product, the product is pasteurized and cooled before the addition of the bacterial suspension.

Depending on the nature of the product, it may be desirable to add dextrose or other sugar to the food product to serve as a fermentable carbon source for the biocontrol agents. The sugar can assist with the proliferation of the inoculants if the temperature and other conditions become suitable for proliferation of the inoculants. Generally, the food product includes from about 0.1 percent by weight to about 1 percent by weight added dextrose or other sugar, if any sugar is added. Some food product have sufficient carbon sources for the biocontrol agents without the addition of additional sugar.

To further illustrate how the biocontrol agents are introduced, the processing of two particular food products with a dry biocontrol agent and one food product with an aqueous biocontrol agent is described in more detail. To prepare a refrigerated pasta sauce, the ingredients are chopped as required, mixed and heated to about 100° C. Upon reaching a temperature of generally 100° C., the sauce is combined with the biocontrol agents. In some embodiments, the biocontrol agents are added to the package/container, which is then filled with the hot pasta sauce at a temperature from about 90° C. to about 100° C. Subsequent to filling, the container generally is inverted to pasteurize the sealing material and to facilitate mixing of the biocontrol agent in the sauce. Suitable containers include plastic pouches, jars, tubs and the like. After sealing the product in a container, the sauce is cooled completely to a refrigeration temperature, generally from about 28° F. –41° F. (–2.2° C.–5° C.). In preferred embodiment, the biocontrol organisms remain effectively dormant up to abusive refrigeration temperatures up to about 50° F. (10° C.).

Filled dough products including ravioli are also of particular interest. The filling and pasta are prepared separately. Some types of fillings such as those involving meat products are cooked. Other fillings such as those based on cheese may not be cooked, and generally are combined while refrigerated. The prepared filling can be combined with a selected biocontrol agent. The biocontrol agent can be added to the filling since the filling may be an area of pathogen growth if the final product is subjected to temperature abuse. Generally, the filling ingredients are passed through a grinder prior to being enrobed with the pasta dough. The grinding process mixes the ingredients and forms them into a desired consistency.

The filling then is combined with the pasta to form the filled pasta dough product. The filled pasta product is then pasteurized. Dry heat or stream pasteurization can also be used to perform the pasteurization. This step generally involves product temperatures from about 65° C. to about 85° C. for about 10 seconds to about 10 minutes. The pasteurization can be performed by injecting steam in the vicinity of the product.

Then, the stuffed or filled pasta product is packaged just prior to the cooling step. The product generally is sealed into a container, such as a polymer pouch, tub or the like. The packaged product is cooled to a refrigeration temperature.

The preparation of different food products can subject the biocontrol agents to different temperature conditions. Based on the description above, suitable dry biocontrol agents can be selected for the specific food preparation process. In particular, the hydration rate of the biocontrol agent should at least account for the amount of time required between adding the biocontrol agent and cooling of the product below pasteurization temperatures.

The application of an aqueous biocontrol agent to the surface of a product, such as a filled pasta product, prior to packaging is surprisingly effective for biopreservation of the product. In general, the filled pasta product is prepared for packaging, including suitable pasteurization. Subsequent to pasteurization, the product rapidly cools to temperatures sublethal to hydrated starter cultures. Then, the aqueous biocontrol agent, generally at a temperature from about 40° F. to about 80° F., is sprayed over the complete filled pasta product just before packaging. The stuffed pasta product coated with the aqueous biocontrol agent is then packaged.

4. Distribution of Food Products

The biocontrol agents are intended to remain dormant, i.e., metabolically inactive. Growth of and acid production by the biocontrol agents indicates that the food product has been subjected to inappropriate storage conditions, in particular temperature abuse. For preferred embodiments, the food products are intended to remain refrigerated until consumed. Thus, immediately following production, the products are refrigerated. The products are shipped in refrigerated vehicles and should be kept in refrigerators by distributors, by retailers and by consumers prior to consumption.

Placing the product at room temperature for brief periods of time during transfer between refrigeration units generally does not initiate significant growth of bacteria. The microorganisms associated with the biocontrol agents preferably undergo growth after prolonged periods of time at temperatures between about 15° C. and about 40° C., i.e., either room temperature or at improperly high refrigeration temperatures. Generally, these conditions result from a distributor or retailer that is not following guidelines established by the manufacturer, although the consumer may also abuse the product. After sufficient time at temperatures above about 10° C., the starter culture begins to proliferate.

Preferred bacteria in the inoculated cultures reduce the pH of the food product upon experiencing conditions in the food product conducive to fermentation and/or growth. The reduced pH inhibits the growth of many potentially harmful microorganisms. Also, the quantities of biocontrol bacteria within the food product should provide a significant competitive advantage relative to the potentially harmful microorganisms within the food product. Thus, the biocontrol bacteria should have sufficient time to produce microorganism inhibiting acids and/or other byproducts to inhibit the potentially harmful organisms before the harmful organisms can proliferate significantly. If the temperature abuse is significant, the food product may no longer be palatable to the consumer due to metabolic activity, i.e., fermentation, by the bacteria in the biocontrol agent. Thus, the consumer is protected both by the inhibition of proliferation of potentially harmful microorganisms and, upon significant temperature abuse, by the rendering of the food product unpalatable.

EXAMPLES

Example 1

Alteration of pH by Selected Bacteria Within a Food Product

This example demonstrates the reduction of the pH of a pasta filling formulated with various lactic acid starter cultures. Measurements of pH are obtained as a function of inoculum size, incubation temperature and time.

The bacterium involved in these studies were *Pediococcus acidilactici, Lactobacillus planatarum, Lactococcus lactis*. A cheese based pasta filling, a meat based pasta filling, and a meat and cheese pasta filling were tested. The meat containing fillings were cooked prior to the start of the study while the cheese based filling was not cooked. According to reported information on *Clostridium botulinum* and its corresponding toxigenesis, a safe value of the pH depends on the water activity of the product. If more water is present, a lower the pH value must be reached in order to be safe from proliferation of *Clostridium botulinum*. For example, the meat and cheese based filling with a lower moisture content had a safe initial pH. The meat based filling had a safe initial pH when mixed with a *P. acidilactici* starter culture due to a slightly lower pH and a slightly lower water activity, but not when mixed with the other starter cultures.

Figure 6:
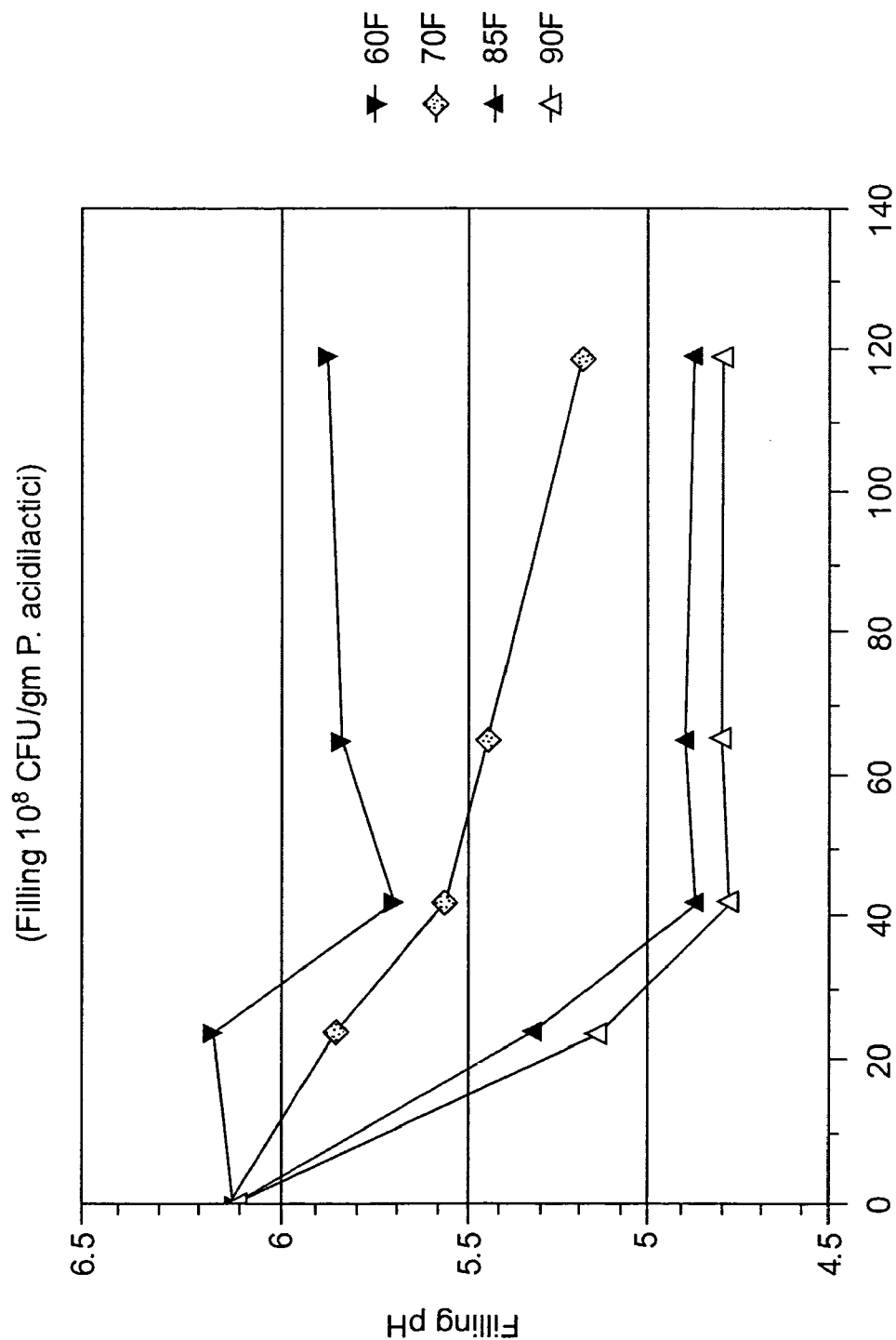
FIG. 6 is plot of cheese based pasta filling pH as a function of incubation time for four incubation temperatures following initial inoculation of the filling with *P. acidilactici*.

The results for the cheese based filling inoculated with *Pediococcus acidilactici* are shown in Table 1 and FIG. 6 for several inoculation amounts and incubation temperatures.

TABLE 1

| (Cheese Based Filling) | | |
| --- | --- | --- |
| Inoculation CFU/gm P. acidilactici | Incubation Temperature (° F.) | Time (hours) to Reach Safe pH of 5.4 |
| $10^4$ | 60 | >120 (did not reach safe pH) |
| $10^4$ | 70 | 90 |
| $10^4$ | 85 | 40 |
| $10^4$ | 90 | 20 |
| $10^6$ | 60 | >120 (did not reach safe pH) |
| $10^6$ | 70 | 65 |
| $10^6$ | 85 | 32 |
| $10^6$ | 90 | 20 |
| $10^8$ | 60 | >120 (did not reach safe pH) |
| $10^8$ | 70 | 70 |
| $10^8$ | 85 | 24 |
| $10^8$ | 90 | 20 |

A safe of 5.4 was not reached at 60° F. (15° C.) for any of the three inoculates.

Figure 7:
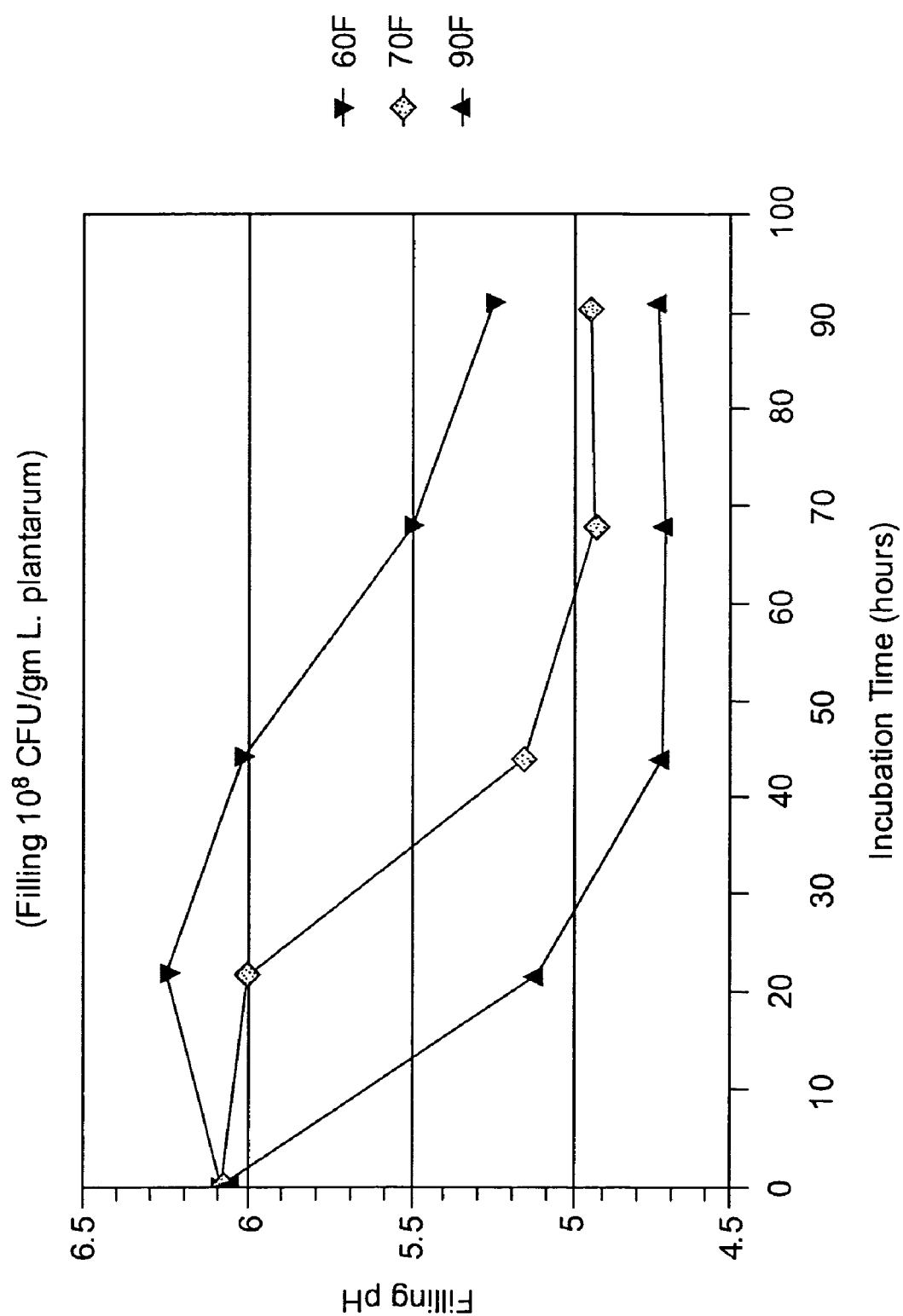
FIG. 7 is plot of cheese based pasta filling pH as a function of incubation time for three incubation temperatures following initial inoculation of the filling with *L. plantarum*.
Figure 8:
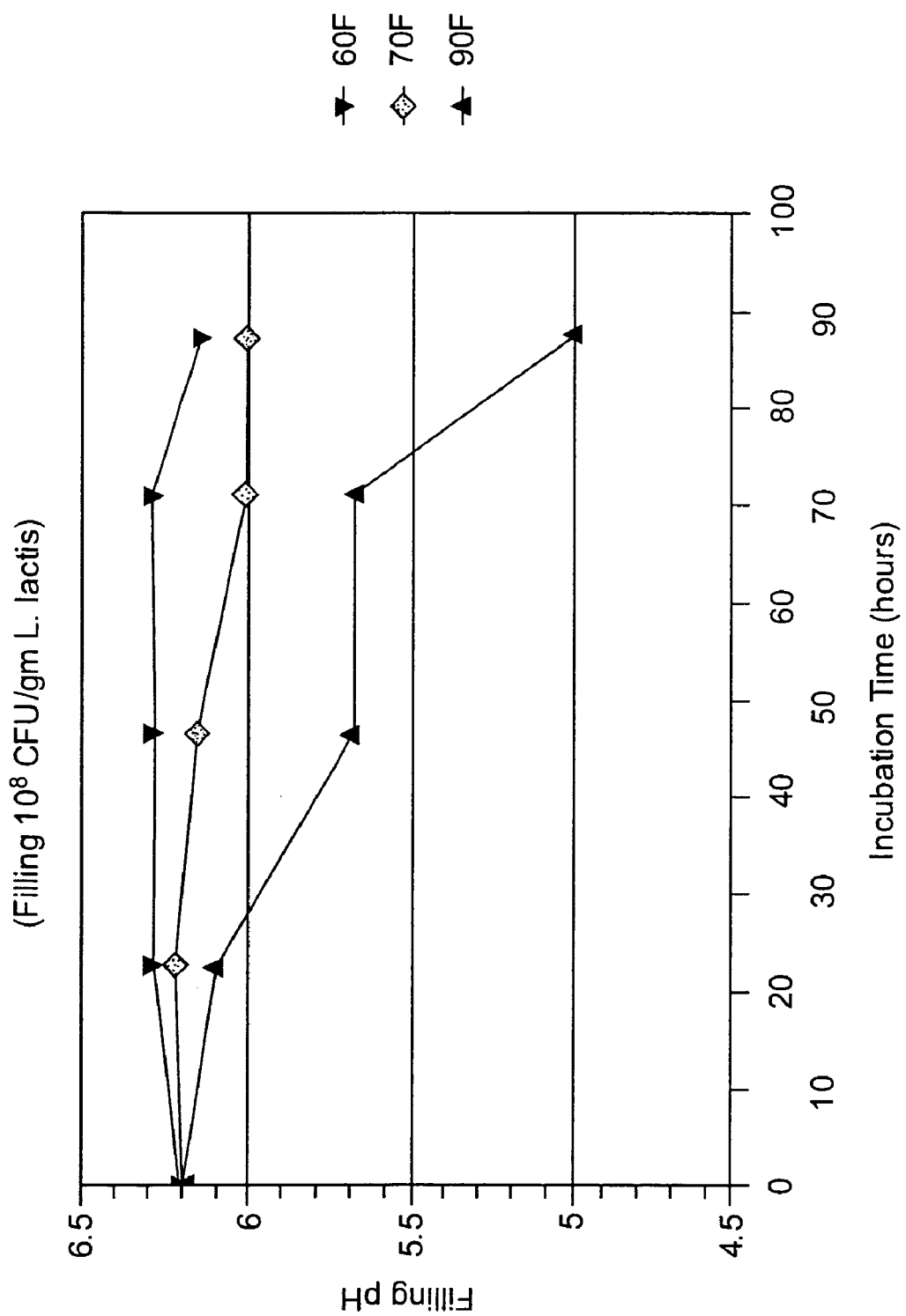
FIG. 8 is plot of cheese based pasta filling pH as a function of incubation time for three incubation temperatures following initial inoculation of the filling with *L. lactis*.

Results for the cheese based filling inoculated with *Lactobacillus planatarum* and *Lactococcus lactis* are shown in Table 2 and FIGS. 7 and 8.

TABLE 2

| Incubation Temperature (° F.) | Inoculum CFU/gm L. plantarum | Time (hours) to Reach Safe pH (5.5) L. plantarum | Inoculation CFU/gm L. lactis | Time (hours) to Reach Safe pH (5.4) L. lactis |
|---|---|---|---|---|
| 60 | $10^6$ | >120 (did not reach safe pH) | $10^6$ | >120 (did not reach safe pH) |
| 70 | $10^6$ | >120 (did not reach safe pH) | $10^6$ | >120 (did not reach safe pH) |
| 90 | $10^6$ | 40 | $10^6$ | >120 (did not reach safe pH) |
| 60 | $10^8$ | 68 | $10^8$ | >120 (did not reach safe pH) |
| 70 | $10^8$ | 35 | $10^8$ | >120 (did not reach safe pH) |
| 90 | $10^8$ | 14 | $10^8$ | 77 |

At the lower inoculation amounts with *Lactobacillus plantarum*, a safe pH was not reached in 120 hours at either 60° F. (15° C.) or 70° F. (20.6° C.) while at an inoculation of $10^8$ CFU/gm a safe pH was reached at all incubation temperatures. With *Lactococcus lactis* safe pH of 5.4 was only reached within 120 hours with an inoculation of $10^8$ at an incubation temperature of 90° F. (32.2° C.).

Figure 9:
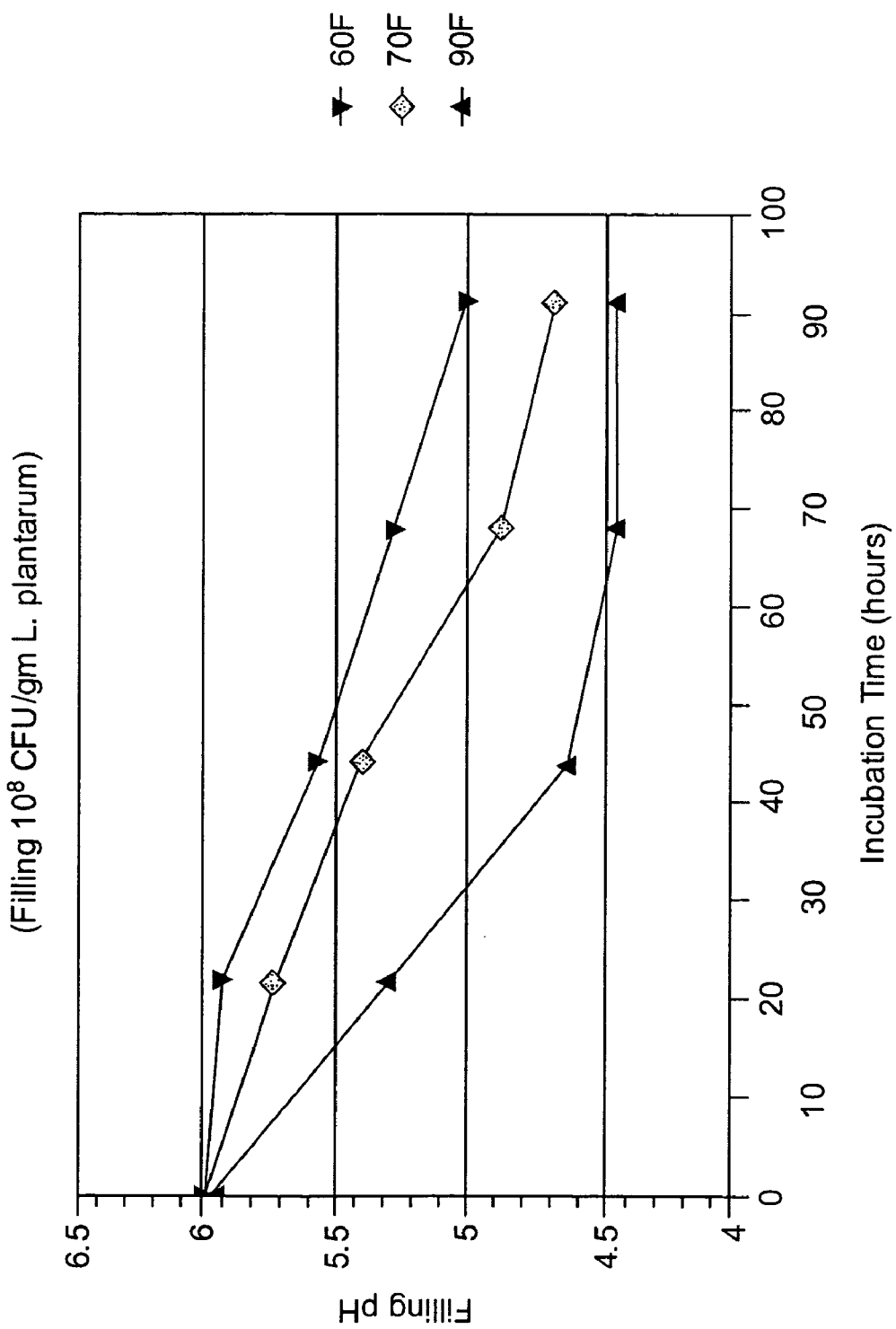
FIG. 9 is plot of meat based pasta filling pH as a function of incubation time for three incubation temperatures following initial inoculation of the filling with *L. plantarum*.

The results for the meat based filling with *Lactobacillus plantarum* and *lactococcus lactis* are presented in Table 3 and FIG. 9.

TABLE 3

(Meat Based Filling)

| Incubation Temperature (° F.) | Inoculum CFU/gm L. plantarum | Time (hours) to Reach at Safe pH of 5.9 L. plantarum | Inoculum CFU/gm L. lactis | Time(hours) to Reach Safe pH (5.4) L. lactis |
|---|---|---|---|---|
| 60 | $10^6$ | >120 (did not reach safe pH) | $10^6$ | >120 (did not reach safe pH) |
| 70 | $10^6$ | 69 | $10^6$ | >120 (did not reach safe pH) |
| 90 | $10^6$ | 38 | $10^6$ | >120 (did not reach safe pH) |
| 60 | $10^8$ | 23 | $10^6$ | >120 (did not reach safe pH) |
| 70 | $10^8$ | 8 | $10^8$ | >120 (did not reach safe pH) |
| 90 | $10^8$ | 5 | $10^6$ | >120 (did not reach safe pH) |

For the meat based filling with *L. plantarum*, a safe pH was not reached within 120 hours for an inoculation of $10^6$ at a temperature of 60° F. (15° C.). For the meat based filling inoculated with *L. lactis* a safe pH was not reached within 120 hours for any of the inoculation sizes.

Example 2

Effect of Pasteurization on Survival of Inoculants

This example involves a determination of the survival of inoculated microorganisms that are pasteurized under various conditions.

A cheese based ravioli filing was inoculated with either $10^6$ or $10^7$ CFU/gm of hydrated *Pediococcus acidilactici* culture. Pasteurization times ranged from about 3 minutes to about 4 minutes and pasteurization temperatures ranged from about 75° C. to about 85° C. In all of the cases, less than 0.01% of the inoculated microorganisms remained. The pasteurization times and temperatures were sufficient based on published values to effect a $\geq 10^6$ reduction of *Listeria monocytogenes*.

To examine if dry starter cultures are better able to survive the pasteurization process, the survival of dehydrated samples of *Pediococcus acidilactici* was compared with survival of hydrated samples. The dry sample contained about $1.8 \times 10^8$ CFU/gm while the hydrated sample contained $2.0 \times 10^8$ CFU/gm. Both samples were then heated to about 75° C. for about 10 minutes. Effectively all of the bacteria in the hydrated samples were killed by the pasteurization. The dried sample after pasteurization had $2.3 \times 10^7$ CFU/gm, less than a one log reduction. Thus, a starter culture in a dry or near dry state have a better chance of surviving a thermal pasteurization process.

Additional experiments were performed to evaluate the viability of freeze dried *Pediococcus acidilactici* following pasteurization. The freeze dried samples with $4.5 \times 10^{11}$ CFU/gm were obtained from Vivolac Culture Products, Indianapolis, Ind. Samples of 0.25 gm each were placed into a ¼ pint heat sealable pouch ("boil n'bag"). The samples in the sealed pouches were placed into a circulating water bath for a specific period of time with two samples used for each pasteurization condition. The number of CFU/gm following pasteurization are presented in Table 4.

TABLE 4

| Minutes Heating | 75° C. | 80° C. | 85° C. |
|---|---|---|---|
| 0 | $4.5 \times 10^{11}$ | $4.5 \times 10^{11}$ | $4.5 \times 10^{11}$ |
| 1 | $1.55 \times 10^{11}$ | $7.85 \times 10^{10}$ | $6.6 \times 10^{10}$ |
| 2 | $1.2 \times 10^{11}$ | $1.1 \times 10^{11}$ | $2.55 \times 10^{10}$ |
| 3 | $1.05 \times 10^{11}$ | $7 \times 10^{10}$ | $1.6 \times 10^{10}$ |
| 4 | $9.25 \times 10^{10}$ | $5.35 \times 10^{10}$ | $4 \times 10^9$ |

When the freeze dried bacteria samples are added to a moist filling, the bacteria gradually hydrate. To evaluate how the rate of hydration alters the survivability of the freeze dried samples, an experiment was performed where freeze dried bacteria are mixed with a pasta filling immediately prior to pasteurization. Freeze dried *Pediococcus acidilactici* with $4.5 \times 10^{11}$ CFU/gm from Vivolac Culture Products were mixed with a cheese based pasta filling in a weight ratio of 0.75 percent freeze dried bacteria to 99.25 percent filling. The resulting mixture had $3.23 \times 10^9$ CFU/grn. Samples of 1.5 gm of the filling mixture each were placed in a sealed ¼ pint pouch.

Five replicates were performed for each pasteurization condition. In addition, five non-pasteurized controls were used. Samples were pasteurized at 75° C., 80° C. or 85° C. for 10, 15, 20, 25 or 30 seconds, for a total of 15 runs. Thus, 80 samples were processed, five controls and 75 pasteurized samples (15 runs of five sample duplicates). The pasteurization was performed by immersing the samples in the pouches in a circulating water bath for the selected time and temperature. The samples were cooled after removal form the water bath by immersing the samples in ice water for 1-2 minutes. To evaluate the ability of the cultures to lower the pH following pasteurization, all 80 samples were then incubated at 32.2° C. for four days. The pH was measured for each sample after 2 days at 32.2° C. and after four days at 32.2° C. The results are shown in Tables 5 and 6.

TABLE 5

(48 Hours)

| Pasteurization Time (seconds) | 75° | 80° C. | 85° C. |
| --- | --- | --- | --- |
| 0 | 4.62 | 4.62 | 4.62 |
| 10 | 5.64 | 5.6 | 5.31 |
| 15 | 5.78 | 6.06 | 6.02 |
| 20 | 6.01 | 5.96 | 6.04 |
| 25 | 5.53 | 6.01 | 6.05 |
| 30 | 6.01 | 5.54 | 6.05 |

TABLE 6

(101 Hours)

| Pasteurization Time (seconds) | 75° C. | 80° C. | 85° C. |
| --- | --- | --- | --- |
| 0 | 4.52 | 4.52 | 4.52 |
| 10 | 5.3 | 5.17 | 5 |
| 15 | 6.02 | 5.17 | 6.02 |
| 20 | 6.02 | 5.81 | 6.08 |
| 25 | 5.66 | 6 | 6.08 |
| 30 | 6.05 | 5.69 | 6.08 |

65° C. Three parts of encapsulant were used for each part of freeze dried culture. The encapsulated culture had $1.9 \times 10^{10}$ CFU/gm, a drop of about 1 log unit. The third starter culture was a fully hydrated, freeze concentrated sample of *Pediococcus acidilactici* with $4.3 \times 10^{11}$ CFU/gm obtained from Vivolac Culture Products.

The biocontrol agents were mixed with a cheese based pasta filling. The filling with the encapsulated starter cultures included 3% by weight encapsulated starter cultures, and the fillings with the freeze dried and freeze concentrated starter cultures each included 1% by weight of the biocontrol agents. The resulting fillings had $5.7 \times 10^8$ CFU/gm filling (encapsulated), $4.5 \times 10^9$ CFU/gm filling (freeze dried) and $4.3 \times 10^9$ CFU/gm filling (freeze concentrated), respectively. After mixing 1.5 gm samples were sealed in ¼ pint heat sealable pouches. The samples were placed in a heated water bath at 85° C. for 15 seconds. Immediately following heating the samples were immersed in an ice water bath.

The samples in triplicate for each set of conditions had time intervals between mixing and pasteurization between 0 hours (<15 minutes) and 24 hours. The filling was refrigerated following mixing prior to pasteurization. The average results are presented in Table 7.

TABLE 7

| Time Interval (hours) between Mixing and Pasteurization | Filling made with Freeze Concentrated *Pediococcus acidilactici* (CFU/gm) | Filling made with Freeze Dried *Pediococcus acidilactici* (CFU/gm) | Filling made with Encapsulated *Pediococcus acidilactici* (CFU/gm) |
| --- | --- | --- | --- |
| 0 | $3 \times 10^7$ | $7 \times 10^6$ | $2 \times 10^7$ |
| 1 | $5 \times 10^3$ | $1.2 \times 10^7$ | $3.5 \times 10^7$ |
| 2 | $5 \times 10^4$ | $5.2 \times 10^7$ | $5.9 \times 10^5$ |
| 3 | $3.9 \times 10^3$ | $6.2 \times 10^7$ | $5.5 \times 10^6$ |
| 4 | $7.6 \times 10^3$ | — | — |
| 5 | $1.2 \times 10^4$ | $1.4 \times 10^7$ | $5.4 \times 10^7$ |
| 6 | $1.1 \times 10^4$ | $1.9 \times 10^7$ | $3.3 \times 10^7$ |
| 7 | $5 \times 10^4$ | $4.1 \times 10^8$ | $5.5 \times 10^7$ |
| 24 | $1.1 \times 10^4$ | $1.1 \times 10^6$ | $1.5 \times 10^4$ |

The amount of time to induce the minimum acceptable reduction of 6 log units in a target pathogen *Listeria monocytogenes* in refrigerated pasta is 26 seconds at 75° C., 6 seconds at 80° C. and 1 second at 85° C. The results presented in Tables 5 and 6 demonstrate that freeze dried *Pediococcus acidilactici* survive pasteurization at 80-85° C. for ≦10 second. In other words, the inoculated dried cultures survive for sufficient period of time to allow for acceptable amounts of reduction of *Listeria monocytogenes*.

Example 3

Post Mixing Time Effect on Starter Culture Viability

The effect of delay between the mixing and the pasteurization on the resulting viability of an encapsulated starter culture is explored in this example.

Three different starter cultures were examined. The first starter culture was a freeze dried culture of *Pediococcus acidilactici* with $4.5 \times 10^{11}$ CFU/gm obtained from Vivolac Culture Products. The second starter culture involved the freeze dried culture of culture 1 encapsulated with an hydrogenated vegetable oil with a melting point between about 50 and about With the exception of the 0 hour time interval between mixing and pasteurization, the fully hydrated, freeze concentrated *Pediococcus acidilactici* starter culture experienced a significant decrease in CFU/gm upon pasteurization. In contrast, the cultures added in a freeze dried state showed little or no decrease in CFU/gm within the mixing to pasteurization time interval of 0-7 hours. A 1 log unit decrease was observed when the filling was held for 24 hours at refrigeration temperature prior to pasteurization. The encapsulated freeze dried starter culture behaved in a similar fashion to the freeze dried sample with the exception of a 2 log decline in CFU/gm at the 2 hour time interval between mixing and pasteurization and a 3 log decline at a 24 hour time interval.

Figure 10:
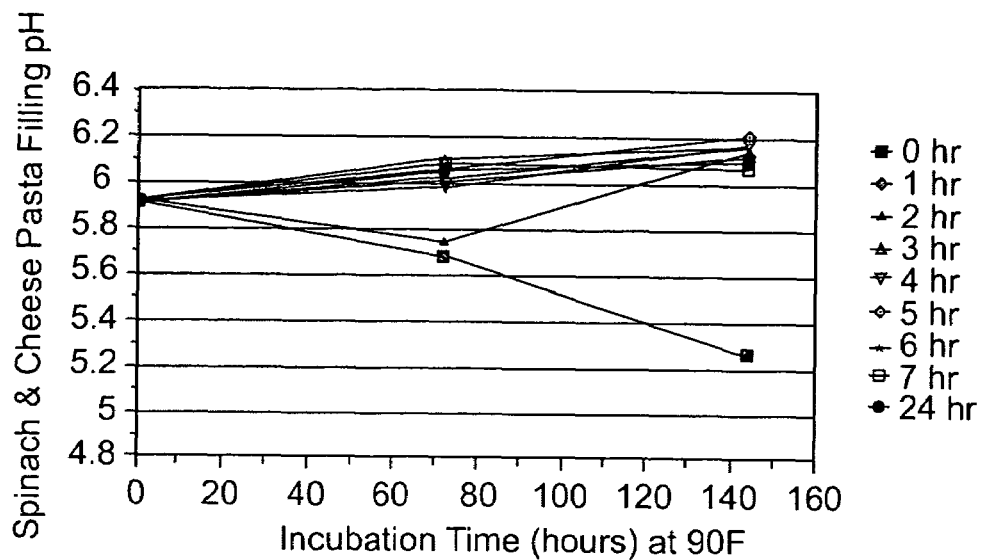
FIG. 10 is a plot of pH of a cheese based pasta filling inoculated with freeze concentrated *Pediococcus acidilactici* as a function of incubation at 90° F. (32.2° C.) following pasteurization, where different lengths of time of refrigeration was allowed between mixing and pasteurization.

The same cultures were studied to examine the ability of the cultures to lower the pH of the filling following incubation at a suitable temperature for proliferation. The results for the freeze concentrated samples are shown in FIG. 10. With the exception of the 0 time interval sample set, all other pasteurized pasta fillings made with the freeze concentrated bacteria failed to reduce the filling pH upon incubation at 90° F. (32.2° C.).

Figure 11:
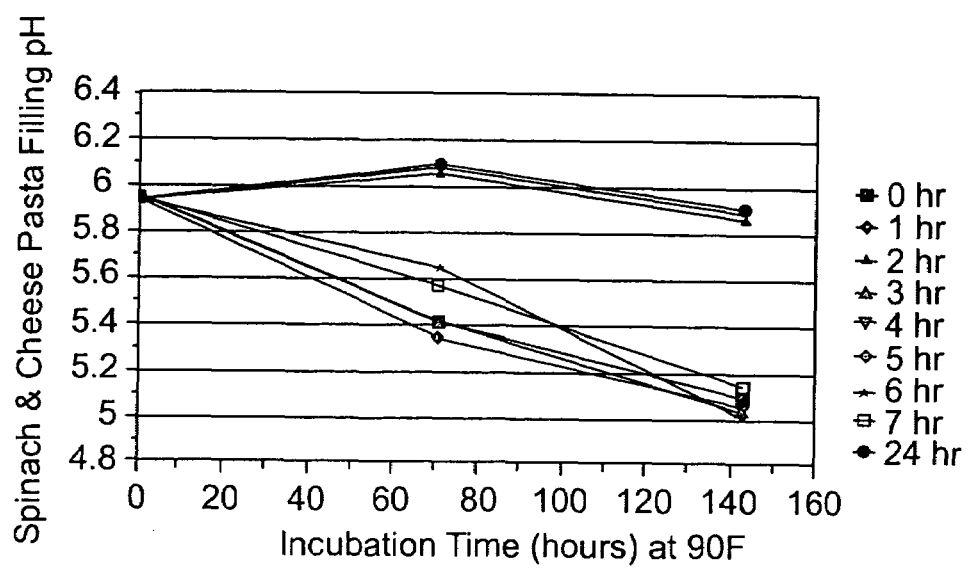
FIG. 11 is a plot of pH of a cheese based pasta filling inoculated with freeze dried *Pediococcus acidilactici* as a function of incubation at 90° F. (32.2° C.) following pasteurization, where different lengths of time of refrigeration was allowed between mixing and pasteurization.
Figure 12:
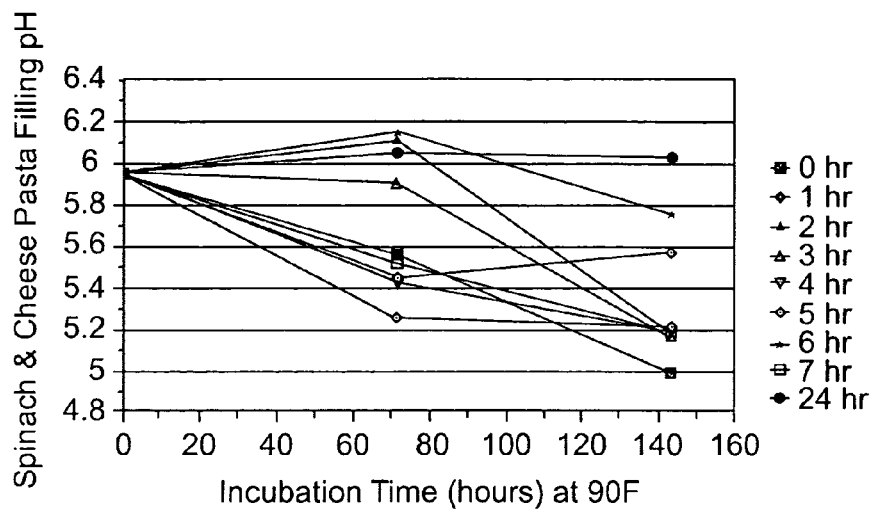
FIG. 12 is a plot of pH of a cheese based pasta filling inoculated with encapsulated freeze dried *Pediococcus acidilactici* as a function of incubation at 90° F. (32.2° C.) following pasteurization, where different lengths of time of refrigeration was allowed between mixing and pasteurization.

The results for the fillings with freeze dried bacteria are shown in FIG. 11. Two dinstinct sample sets are evident. The first set of samples (0, 1, 3, 6 and 7 hour interval samples) were capable of reducing the filling pH, and a second set (2, 4, 5 and 24 hour interval samples) were incapable of reducing the filling pH. The results for the encapsultated freeze dried bacteria are shown in FIG. 12. The results display a range of pH decline as a function of storage time at 90° F. (32.2° C.) with no unambiguous correlation between the extent of pH decline and time interval between mixing and pasteurization. The various results of the dried sample may be due to variability in the extent of hydration prior to and upon pasteurization. Later experimentation showed that the pasteurization time employed was comparable/equal to the hydration time at the elevated pasteurization temperature, such that some survived and some did not. The encapsulation may add another level of variability and complexity to the hydration process.

A 20 ml quantity of 1% dextrose solution was added to the other 14 sample pouches. Five minutes after adding the dextrose solution, twelve of the pouches were heated and cooled as described above with respect to the first 12 pouches. The 24 pasteurized samples and the 2 un-heated controls were placed in a 32.3° C. incubator. Based on visual and microscopic inspection of the samples, the encapsulate starts to break down immediately upon contact with water.

The pH was measured in each of the samples after 0 hours of incubation, 21 hours and 49 hours. The results are shown in Tables 8 and 9.

TABLE 8

(Dry-before addition of dextrose)

| Time (hours) @ 32.2° C. | No Heat Control | 70° C. 1 min. | 70° C. 2 min. | 72° C. 1 min. | 72° C. 2 min. | 74° C. 1 min. | 74° C. 2 min. |
| --- | --- | --- | --- | --- | --- | --- | --- |
| 0 | 5.57 | 5.57 | 5.57 | 5.57 | 5.57 | 5.57 | 5.57 |
| 21 | 4.66 | 4.46 | 4.41 | 4.33 | 4.39 | 4.66 | 4.56 |
| 49 | 4.22 | 4.18 | 4.25 | 4.32 | 4.6 | 3.93 | 4.01 |

TABLE 9

(Wet-after addition of dextrose)

| Time (hours) @ 32.2° C. | No Heat Control | 70° C. 1 min. | 70° C. 2 min. | 72° C. 1 min. | 72° C. 2 min. | 74° C. 1 min. | 74° C. 2 min. |
| --- | --- | --- | --- | --- | --- | --- | --- |
| 0 | 5.57 | 5.57 | 5.57 | 5.57 | 5.57 | 5.57 | 5.57 |
| 21 | 4.66 | 5.2 | 5.34 | 5.2 | 5.33 | 5.331 | 5.37 |
| 49 | 4.22 | 4.79 | 5.17 | 5.14 | 5.6 | 5.26 | 5.65 |

Example 4

Effect of Exposure to Moisture on the Stability of Encapsulated Starter Culture

Encapsulated starter cultures were contacted with water to evaluate the hydration of the encapsulated cultures. The effect of pasteurization on inoculated cultures exposed to water before or after the pasteurization was examined by evaluating the ability of the cultures to lower the pH of a dextrose solution.

Freeze dried *Pediococcus acidilactici* starter cultures were obtained from Vivolac Culture Products with $4.5 \times 10^{11}$ CFU/gm. The encapsulation was performed by mixing 1 part of freeze dried culture with 3 parts emulsified monoglyceride from Danisco Ingredients (Brabrand, Denmark) with a melting point of 71° C. as determined by DSC calorimetry. The encapsulated culture had $5.2 \times 10^9$ CFU/gm. Samples of 0.5 gm of encapsulated starter culture were placed into 26 separate pouches.

Twelve of the 26 samples were heated in a water bath. Six samples were heated for 1 minute (2 at each of 70° C., 72° C. and 74° C.), and six were heated for 2 minutes (2 at each of 70° C., 72° C. and 74° C.). Immediately after heating, the pouches were cooled by immersion into ice water. After cooling for 1-2 minutes, 20 ml of 1% dextrose solution in water was added to each pasteurized pouch, and the pouches were heat sealed.

The samples in which the dextrose solution was added prior to pasteurization was unable to lower the pH below 5. Presumably, the cultures in the samples with the added dextrose solution became hydrated prior to or during pasteurization and were inactivated upon heating. These results are similar to what was found with respect to pasteurization after prolonged times with the encapsulated cultures mixed with the pasta filling, see Example 3 above.

Example 5

Evaluation of Encapsulation to Limit Starter Culture Hydration

Various biocontrol cultures were evaluated to determine if they resist hydration sufficiently such that following pasteurization, they can reduce the pH of a dextrose solution.

Freeze dried starter cultures of *Pediococcus acidilactici* with $4.5 \times 10^{11}$ CFU/gm were obtained from Vivolac Culture Products. Shortening coated samples were prepared by adding 10 gm of shortening to 5 gm freeze dried culture and mixing thoroughly with a spoon. The shortening was a soy and cottonseed shortening with a mono and diglyceride base. The shortening had a melting point of 112° F. (44.4° C.). Other samples were prepared by first encapsulating one part freeze dried starter culture with three parts of monoglyceride emulsifier with a melting point of 71° C. The monoglyceride/culture mixtures had $5.2 \times 10^9$ CFU/gm. Then, 10 gm of shortening was added to 10 gm monoglyceride/culture mixture and mixed thoroughly with a spoon to form shortening/emulsifier/culture samples.

A third set of samples were formed from tablets with 40.0% *Pediococcus acidilactici*, 58.5% HPMC (hydroxy propyl methylcellulose), 0.5% silicon dioxide, and 1% by weight magnesium stearate. The tablets contained $8.1 \times 10^9$ CFU/gm. The tablets had a weight of 0.71 gm. Each tablet was broken into pieces between 1-3 mm in length and a weight of about 0.08 gm.

A 1 gm quantity of culture/shorting mixture was added with 9 ml of 1% by weight dextrose solution to a pouch which was then heat sealed. Similarly, 1 gm of emulsifier/culture/shortening/culture mixture was added with 9 ml of 1% dextrose solution to a pouch which was then heat sealed. Duplicates were made of both types of samples. All of the samples were mixed by massaging the pouches by hand.

One of each type of sample was pasteurized by submerging the pouch in a water bath at 69° C. for three minutes. Immediately after pasteurization, the samples were immersed in an ice bath. The pasteurized and nonpasteurized samples were then stored at 90° F. (32.2° C.).

In addition, a 10 ml quantity of 1% dextrose was placed into a pouch and heated in a water bath at 69° C. for 3 minutes. Then, a 0.25 gm quantity of HPMC/culture tablet pieces was added to the pouch with just dextrose solution. Following the addition of the tablet pieces to the hot solution, the pouch was kept in the heated water for an additional 3 minutes. Then, the pouch was removed from the water bath and immersed in an ice bath. After cooling for about 1 minute, the pouch was heat sealed and stored at 90° F. (32.2° C.).

Also, a 0.25 gm quantity of HPMC/culture tablet was added with 10 ml of 1% dextrose to a pouch which was then heat sealed. This pouch was used as a control.

The pH of all of the samples was measured at 0 hours and at 65 hours of storage at 90° F. (32.2° C.). The results are presented in Table 10.

TABLE 10

| Sample | pH Time 0 | pH after 65 hours @ 90° F. |
|---|---|---|
| HPMC Tablet (no heat) | 5.82 | 4.13 |
| HPMC Tablet Pasteurized | 5.82 | 4.59 |
| Freeze Dried + Shortening (no heat) | 5.75 | 4.03 |
| Freeze Dried + Shortening Pasteurized | 5.75 | 5.58 |
| Emulsifier + Shortening Control (no heat) | 6.31 | 3.81 |
| Emulsifier + Shortening Pasteurized | 6.31 | 4.9 |

The shortening coated emulsifier/culture samples and the HPMC tablet pieces were effectively protected from hydration during pasteurization such that the pasteurized samples were able to lower the pH of the dextrose solution. On the other hand, coating freeze dried starter cultures in shortening provided little if any protection from hydration during pasteurization as demonstrated by the inability of the pasteurized cultures to lower the pH of the dextrose solution. The HPMC tablet fragments had completely dissolved into a gel along the bottom of the pouch after 65 hours at 90° F. (32.2° C.)

Example 6

Evaluation of Different Encapsulation Approaches

This example demonstrates the delivery of a viable inoculum of starter cultures into a pasteurized, hot filled pasta sauce product.

The pasta sauce was a dairy-based cream style sauce. The starter cultures were introduced in one of two ways. In the first approach, a freeze dried culture was formed into a tablet with HPMC. Equivalent tablets were described above in Example 5. In the second approach, the starter cultures were placed within a sachet formed from HPMC.

The tablets were obtained from Danisco Ingredients (Brabrand, Denmark). The tablets contained about 40.0 percent by weight freeze dried *Pediococcus acidilactici*, about 58.5 percent HPMC, about 0.5 percent silicon dioxide and about 1.0 percent magnesium stearate. The tablets contained about $8.1 \times 10^9$ CFU/gm. The tablet was fractured, and 25 fragments of approximately 0.08 gm each were collected. Individual 0.08 gm tablet fragments were placed into 24 separate two pint plastic containers.

The sachets were formed by folding a 1"×2" piece of HPMC film in half lengthwise. The film was EM 1100 film from Watson Food Co., Inc. (West Haven, Conn.). The two outside seams of the folded film were sealed with an impulse sealer. About 0.03 gm of freeze dried *Pediococcus acidilactici* ($4.5 \times 10^{11}$ CFU/gm) from Vivolac Cultures was added to each sachet. After addition of the cultures, the remaining open seam was sealed with an impulse sealer. Individual sachets were placed into 24 two pint plastic containers. An additional sachet was kept as a control.

The pasta sauce was prepared with or without 1 percent by weight added dextrose. Pasta sauce in 300 gram quantities were poured at 90° F.(32.2° C.) into the 48 containers prepared as described above with half of the containers including the added dextrose. A control was also made by pouring about 300 gm of pasta sauce with dextrose into a container without a sachet or tablet fragment.

Immediately after hot filling, the containers were covered with lids and placed into 40° F. (5° C.) storage for 24 hours. After 24 hours of cooling at 40° F. (5° C.), six of the containers with dextrose and a sachet were hand mixed with a clean large spoon for about one minute. Similarly, six of the containers with a sachet and no dextrose, six containers with dextrose and a tablet fragment, and six containers with a tablet fragment and no dextrose were hand mixed. Duplicates of each type of container were placed into storage at 40° F. (5° C.), 70° F. (20.6° C.) and 90° F. (32.2° C.). The control was also stored at 90° F. (32.2° C.).

Enumeration of viable bacteria was performed on some of the samples stored at 40° F. (5° C.) after 24 hours and some of the samples stored at 90° F. (32.2° C.) after 48 hours. The results are shown in Table 11.

TABLE 11

| Sample | Incubation Temperature and Time | CFU/gm Pasta Sauce |
|---|---|---|
| – dextrose + sachet | 40° F. @ 24 hours | <10 |
| + dextrose + sachet | 40° F. @ 24 hours | <10 |
| – dextrose + tablet | 40° F. @ 24 hours | 20,000 |
| + dextrose + tablet | 40° F. @ 24 hours | 8000 |
| + dextrose + sachet + mixing | 90° F. @ 48 hours | $5.6 \times 10^8$ |
| + dextrose + tablet + mixing | 90° F. @ 48 hours | $2.5 \times 10^8$ |
| uninoculated + dextrose | 90° F. @ 48 hours | <10 |

After 24 hours at 40° F. (5° C.), the CFU/gm counts were very low. These low values may be the result of incomplete release and hydration of the starter cultures from the sachets and tablet fragments. After 48 hours at 90° F. (32.2° C.) the CFU/gm counts were significantly higher. Clearly, the starter cultures survived the hot-fill process. Two explanations can be given for the high values at 90° F. (32.2° C.) after 48 hours. First, it may take between 24 and 48 hours for the effective starter culture to release into the pasta sauce system. Second, a relatively small starter culture population that survived the initial hot fill process may have multiplied over the 48 hour time period at 90° F. (32.2° C.).

Figure 13:
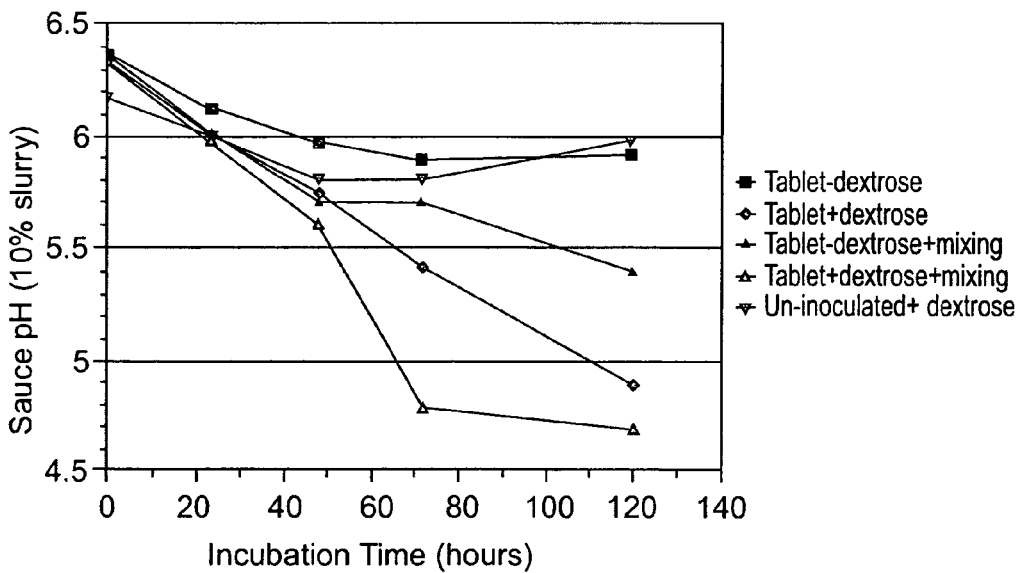
FIG. 13 is a plot of the pH of a pasta sauce as a function of incubation time at 90° F. (32.2° C.), where the pasta sauce was inoculated with a fragment of a tablet starter culture.

The pH of the sauce was measured daily during storage at 90° F. (32.2° C.) and 70° F. (20.6° C.). The results are presented in FIGS. 13-16. FIGS. 13 (tablet fragments) and 14 (sachets) include the results following incubation at 90° F. (32.2° C.) and FIGS. 15 (tablet fragments) and 16 (sachets) include the results following incubation at 70° F. (20.6° C.). With respect to the results in FIG. 13, the pH of the samples with dextrose declined a greater amount over time than comparable samples without dextrose. In addition, mixing prior to incubation appeared to facilitate pH decline. These result suggest that mixing may facilitate the release and distribution of the bacteria in the pasta sauce. The pH of the control (un-inoculated+dextrose) declined only slightly.

Figure 14:
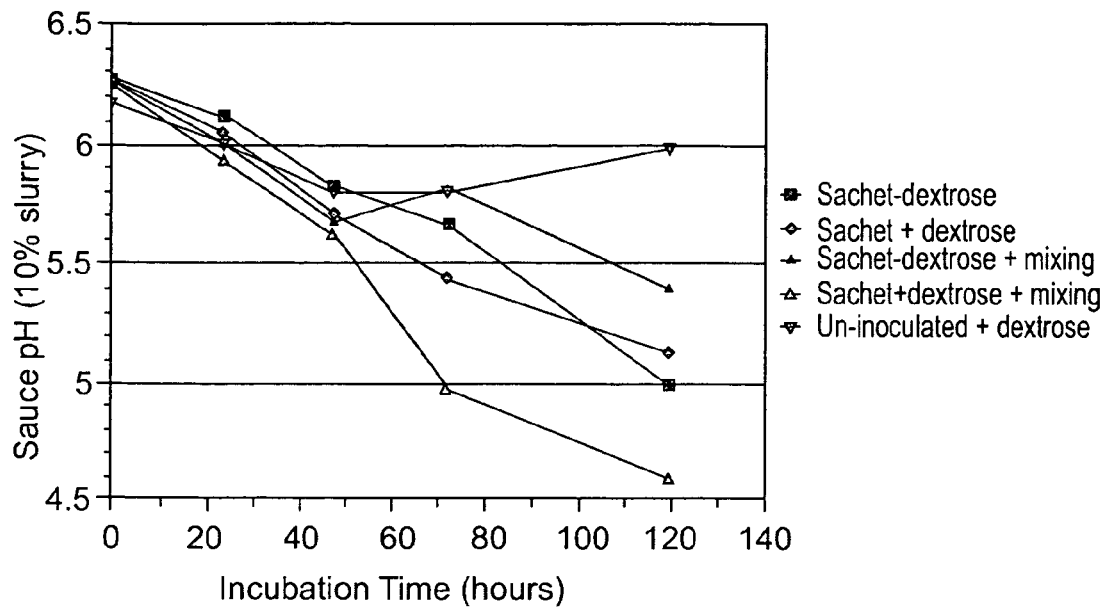
FIG. 14 is a plot of the pH of a pasta sauce as a function of incubation time at 90° F. (32.2° C.), where the pasta sauce was inoculated with a HPMC sachet containing a freeze dried starter culture.
Figure 15:
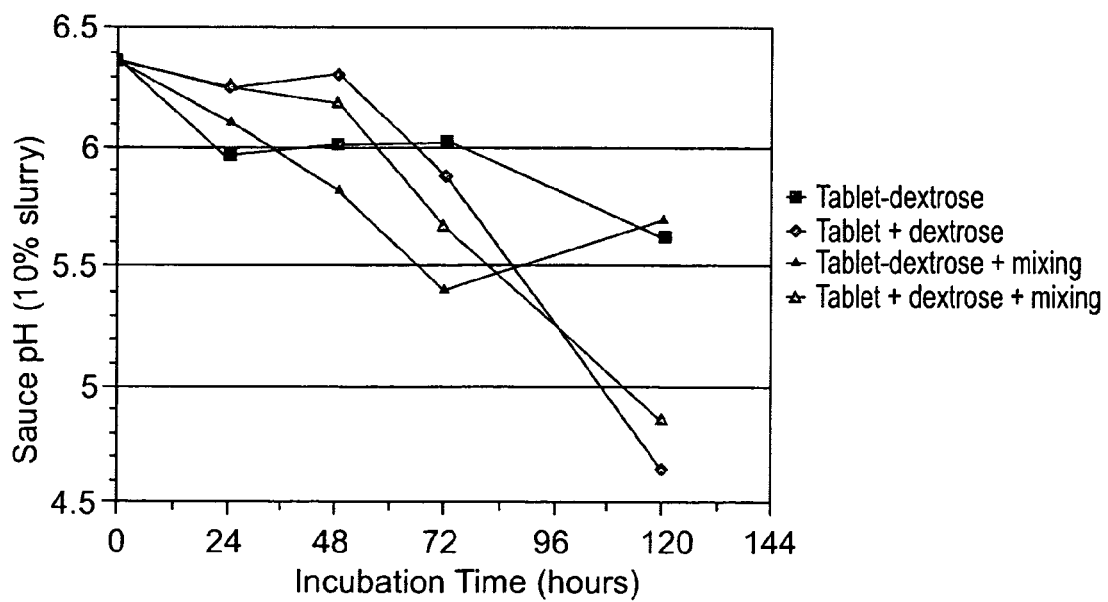
FIG. 15 is a plot of the pH of a pasta sauce as a function of incubation time at 70° F. (20.6° C.), where the pasta sauce was inoculated with a fragment of a tablet starter culture.
Figure 16:
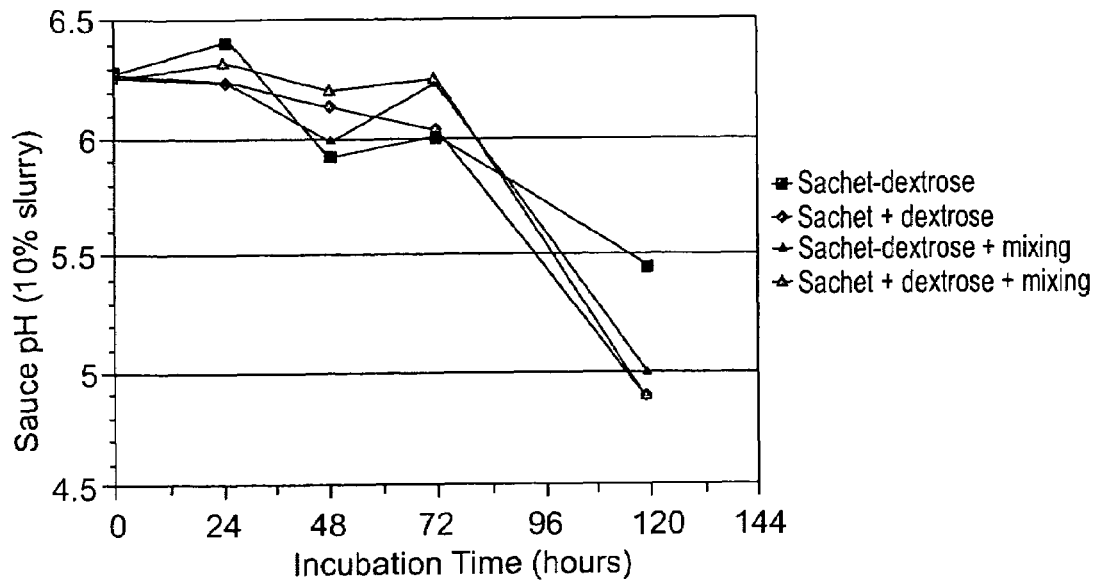
FIG. 16 is a plot of the pH of a pasta sauce as a function of incubation time at 70° F. (20.6° C.), where the pasta sauce was inoculated with a HPMC sachet containing a freeze dried starter culture.

Similar, results were obtained with the sachet, as shown in FIG. 14 except that mixing did not lead to a greater decline in pH for the samples lacking dextrose. The results at 70° F. (20.6° C.) shown in FIG. 15 show similar results except that the results show less effect of mixing and that the samples with dextrose show a 48 hour lag prior to the pH decline. The results with the sachet incubated at 70° F. (20.6° C.) (FIG. 16) show a 72 hours lag prior to significant pH decline. Also, the results in FIG. 16 show a large pH decline for mixed samples without added dextrose. Overall, the tablet fragments and the sachet performed similarly in protecting starter cultures.

Example 7

Topical Application of Biocontrol Agent to Refrigerated Filled Pasta

This example demonstrates the ability of a liquid starter culture applied topically on the outside of a filled pasta product to reduce the pH of both the pasta product and the filling.

A filled pasta product was used with a cheese based filling. About 300 filled pasta portions were prepared with a Dominioni Punto & Pasta machine model A 120 (Caccivio, Italy). The filled pasta portions were steam pasteurized at 98° C. for 47 seconds. Seven boil'n'bag pouches were sealed with 8 filled pasta portions each, to serve as a control.

A starter culture solution was prepared by mixing I gm freeze dried *L. plantarum* from Vivolac Cultures ($9 \times 10^{11}$ CFU/gm) into 999 ml water to produce an aqueous suspension with $9 \times 10^8$ CFU/ml. The aqueous suspension of *L. plantarum* was poured into a 8"×11 " Pyrex casserole dish. A total of 57 filled pasta portions were dipped, about eight at a time, into the aqueous suspension for 15-30 seconds. After dipping, the filled pasta portions were removed with a spatula and patted dry with a towel. Then, the filled pasta portions were sealed in seven boil'n'bag pouches with eight portions in each bag. Another 56 filled pasta portions were dipped in the suspended starter culture but were punctured 8 times with a thin metal wire, four punctures per side prior to dipping. They were then processed in the same way as the other dipped samples.

Figure 17:
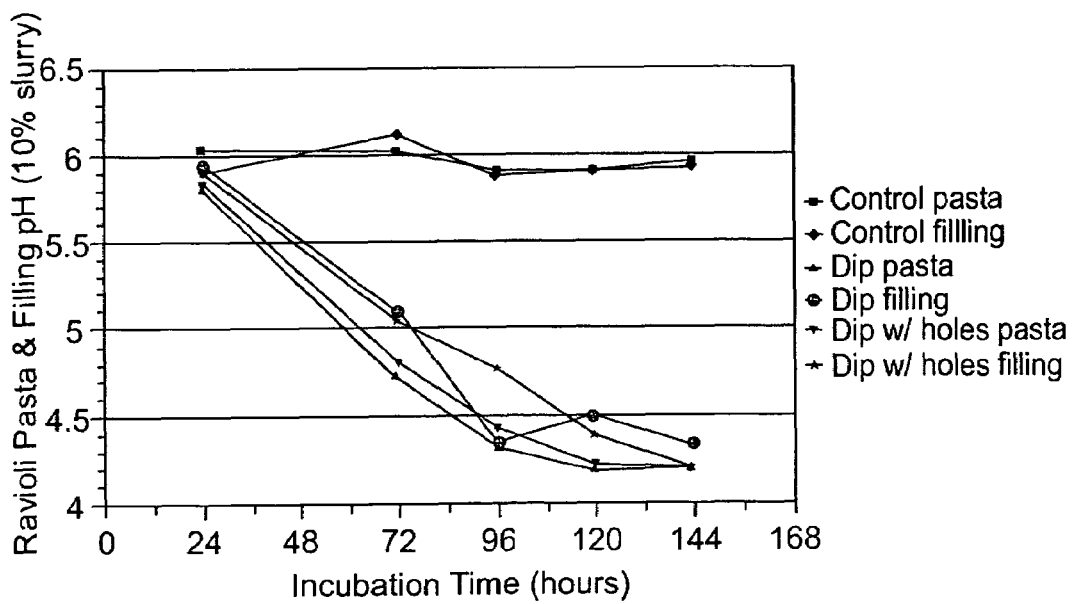
FIG. 17 is a plot of pH as a function of incubation time for a pasta and a filling within the pasta following dipping of the filled pasta in a starter culture solution, where the samples were incubated at 85° F.

The three types of samples, control, dipped and dipped with holes, were stored at 85° F. The filling and pasta pH were measured after 24, 72, 96, 120 and 144 hours incubation times at 85° F. The pH measurements were performed on a 10% aqueous slurry of pasta and filling, separately, from 4 filled pasta portions. Two measurements were made per sample pouch. The results are presented in FIG. 17. While the pH of the control samples did not change significantly, the pH of the dipped and dipped with holes samples decreased to values less than 4.6 after five days of storage. Thus, both the filling and the pasta exhibited a significant pH drop. This demonstrates that the hydrogen ions giving rise to the pH drop were able to migrate through the pasta to lower the pH of the filling within the pasta even though the starter culture was only applied to the outside of the pasta portions.

Example 8

*Clostridium botulinum* Challenge Study

This example demonstrates the efficacy of biocontrol delivery approaches in preventing botulinum toxigenesis in a pasta sauce. Two different types of microorganisms are tested.

Three different types of starter cultures were prepared. The first type were freeze dried (FD) samples of *Lactobacillus plantarum* with $9 \times 10^{11}$ CFU/gm from Vivolac Cultures, Indianapolis, Ind. The second type of starter cultures (HPMC/LP) were tablets fragments of about 0.08 gm each, which were made from about 40.0% by weight freeze dried *Lactobacillus plantarum* from Vivolac Cultures, 58.2% HPMC, 0.5% silicon dioxide and 1.0% magnesium stearate. The HPMC/LP samples had $7 \times 10^7$ CFU/gm. The third type of samples (HPMC/PA) were about 0.08 gm tablet fragments made from 40.0% by weight freeze dried *Pediococcus acidilactici,* 58.2% HPMC, 0.5% silicon dioxide and 1.0% magnesium stearate. The HPMC/PA sampled also had $7 \times 10^7$ CFU/gm.

Thirty nine tubs (425 gm each) of cream based pasta sauce were used in the study. To process a particular batch, the sauce from a tub was poured into a 6L steam jacket Greon kettle equipped with a swept surface mixing attachment and heated to a temperature from about 95° C. to about 100° C. Upon reaching a temperature of 95° C., a 1 percent quantity of dextrose was added to serve as a fermentable substrate, and 16 percent additional water was added to account for evaporative losses. Aluminum foil was wrapped over the open kettle to reduce evaporative loss upon heating.

The samples were held at a temperature between about 95° C. and 100° C. for about 1 minute prior to filling sample pouches with the sauce. The pouches were 96 fl oz KaPac® ScotchPak® heat sealable pouches, 4.5 mm thick heavy duty. For the preparation of 23 pouches, a HPMC tablet was placed in the pouch prior to addition of the heated sauce. Sixteen samples were placed into pouches without an HPMC tablet. After filling, the sauce samples were impulse sealed and stored at −10° F. until the sauce temperatures were less that about 40° F. but not frozen. Upon cooling, the samples were transferred to 40° F. storage.

Of the sixteen samples lacking HPMC tablets, four samples were inoculated with freeze dried starter culture of *Lactobacillus plantarum* to yield $10^4$ CFU per gm sauce ($10^4$ LP samples), and four different samples were inoculated with freeze dried starter culture of *Lactobacillus plantarum* to yield $10^6$ CFU per gm sauce ($10^6$ LP samples). The freeze dried starter cultures were added to refrigerated pouches approximately 24 hours after filling the pouches. Since the starter cultures were added to refrigerated samples, the starter cultures were not inactivated during processing even though they were not encapsulated. While this approach is found to be effective, see below, it may not be preferred on a commercial scale due to different processing requirements. The remaining eight samples were used for controls.

The refrigerated pouches, except for four of the control samples to serve as negative controls, were inoculated with 100 heat activate spores of Clostridium botulinum per gm of sauce. Clostridium botulinum inoculants included an equal mixture of proteolytic type A, B spores and non-proteolytic type E spores. The Clostridium botulinum inoculations were performed at Deibel Laboratories, Madison, Wis.

Figures 18, 19:
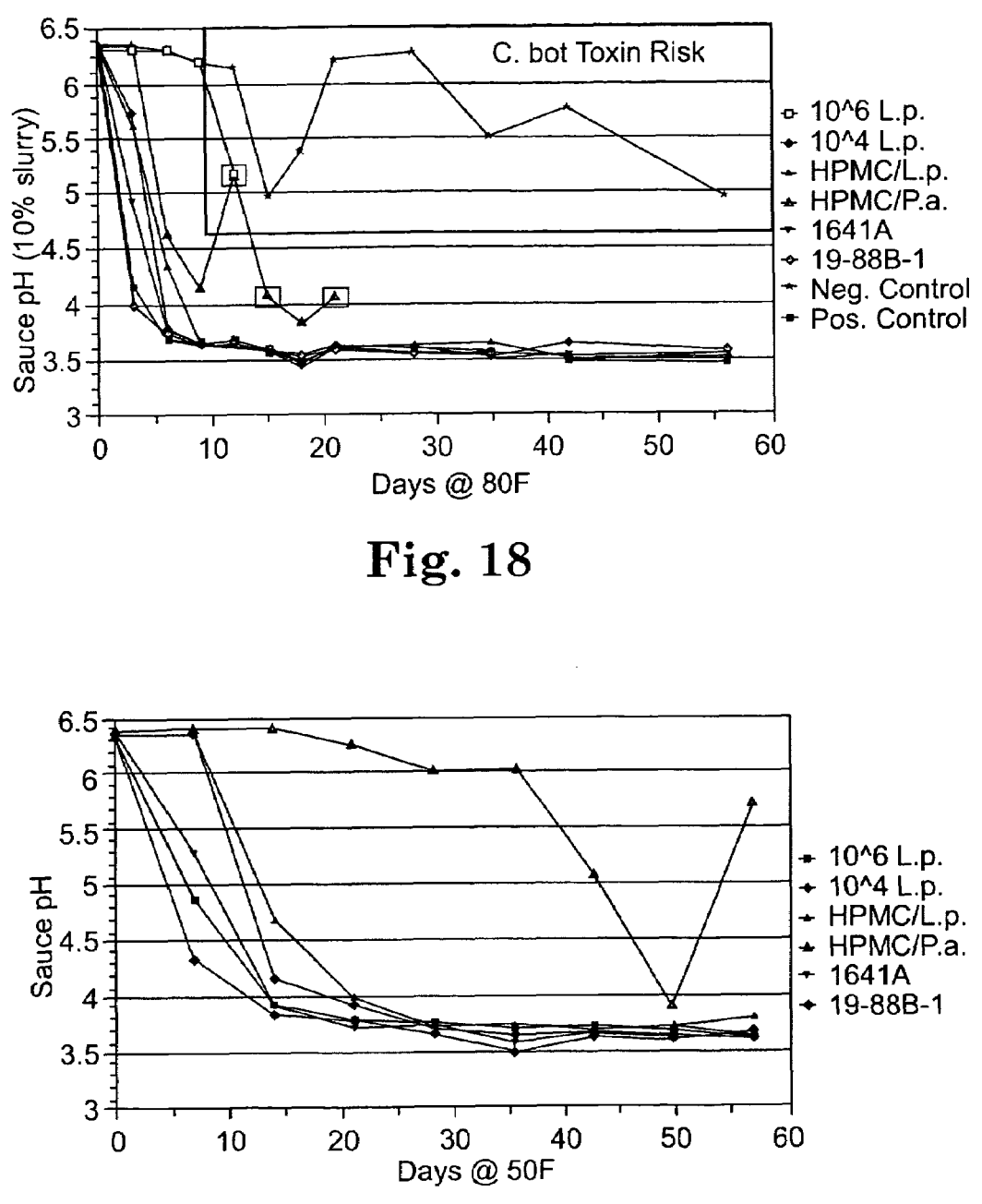

Following inoculation with Clostridium botulinum, a first portion of the samples were stored at 50° F. and a second portion of the samples were stored at 80° F. Periodically during storage, a portion of the sample was removed for physical examination and for a measurement of pH. Values of the pH were measured for the sauce samples by forming a 10% aqueous sauce solution. Plots of the pH as a function of time are presented in FIGS. 18 (stored at 80° F.) and 19 (stored at 50° F.), and the results are presented also in Tables 12 and 13.

TABLE 12

| | (80° F.) | | | | | |
|---|---|---|---|---|---|---|
| Days @ 80° F. | $10^4$ CFU/ gm | $10^6$ CFU/ gm | HPMC/ LP | HPMC/ PA | Neg. Control | Pos. Control |
| 0 | 6.34 | 6.35 | 6.37 | 6.36 | 6.33 | 6.3 |
| 3 | 5.71 | 4.17 | 5.6 | 6.33 | 6.30 | 6.29 |
| 6 | 3.78 | 3.69 | 4.35 | 4.63 | 6.29 | 6.28 |
| 9 | 3.67 | 3.65 | 3.64 | 4.16 | 6.17 | 6.19 |
| 12 | 3.64 | 3.67 | 3.69 | 5.17 | 6.12 | 5.16[3] |
| 15 | 3.58 | 3.6 | 3.57 | 4.09[1] | 4.97[2] | — |
| 18 | 3.55 | 3.51 | 3.53 | 3.84 | 5.37[2] | — |
| 21 | 3.63 | 3.61 | 3.6 | 4.07[1] | 6.19[2] | — |
| 28 | 3.6 | 3.61 | 3.64 | — | 6.25[2] | — |
| 35 | 3.51 | 3.55 | 3.65 | — | 5.49 | — |
| 42 | 3.54 | 3.5 | 3.51 | — | 5.76[2] | — |
| 56 | 3.53 | 3.46 | 3.55 | — | 4.96[1] | — |

Bold indicates positive for C. botulinum toxin,
[1] Liquefied/off odor,
[2] Slightly Liquefied/ok odor,
[3] Off odor.

The $10^4$ LP, $10^6$ LP and HPMC/LP samples successfully reduced the pH of the sauce and prevented proliferation of the Clostridium botulinum. The HPMC/PA samples exhibited reduced pH over a longer period of time than the Lactobacillus plantarum samples. The HPMC/PA samples also exhibited contamination from Clostridium botulinum. It is believed that the HPMC/PA samples became contaminated because the pH reduction occurred too slowly, such that the Clostridium botulinum was able to proliferate prior to reduction of pH. Note that Clostridium botulinum does not grow and produce toxin at a pH below 4.6.

TABLE 13

| | (50° F.) | | | |
|---|---|---|---|---|
| Days at 50° F. | $10^4$ CFU/gm | $10^6$ CFU/gm | HPMC/LP | HPMC/PA |
| 0 | 6.34 | 6.35 | 6.37 | 6.37 |
| 7 | 6.34 | 4.86 | 6.37 | 6.38 |
| 14 | 4.16 | 3.93 | 4.7 | 6.38 |
| 21 | 3.82 | 3.81 | 4.01 | 6.22 |
| 28 | 3.72 | 3.78 | 3.74 | 6.01 |
| 35 | 3.65 | 3.72 | 3.76 | 6.03 |
| 42 | 3.69 | 3.73 | 3.71 | 5.07 |
| 49 | 3.73 | 3.69 | 3.77 | 3.93 |
| 56 | 3.64 | 3.66 | 3.83 | 5.72[3] |

[3] Off odor

Except for the HPMC/PA samples, the remaining samples lowered the pH below 4.0 upon incubation at 50° F.

Example 9

Biocontrol Assessment of L. acidophilus. L. helveticus and L. salivarious

This example demonstrates the effectiveness of organisms at lowering the pH of a food product at dangerous abuse temperatures without significantly modifying the food product at slightly elevated refrigeration temperatures.

A quantity of creamy pasta sauce was placed in a jacketed Groen® kettle and heated to 95° C. The sauce was hot filled into 30 KaPack® heat sealable pouches, 200 gm of sauce per pouch. The filled pouches were impulse sealed. Then, the sealed pouches were cooled to 40° F. in a −10° F. freezer.

The cooled samples were inoculated with freeze dried starter cultures. Starter cultures contained freeze dried strains of Lactobacillus acido-philus ($8.0 \times 10^{10}$ CFU/gm), Lactobacillus helveticus ($2.0 \times 10^{11}$ CFU/gm), or Lactobacillus salivarious ($3.0 \times 10^{10}$ CFU/gm). Before inoculating the sauce samples, the freeze dried starter cultures were added to a dilution buffer to produce a bacterial suspension with $2 \times 10^8$ CFU/ml. To produce the suspensions, the freeze dried cultures were added in weights of 0.25 gm L. acidophilus, 0.1 gm L. helveticus or 0.67 gm L. salivarious per 100 ml of buffer. The buffer was Butterfield's™ sterile phosphate buffer from International Bioproducts, Inc., Redmond, Wash. Ten sauce filled pouches were inoculated with each bacterial strain. One ml of bacterial suspension was added to each pouch. Following inoculation, the sauces contained from about $1 \times 10^4$ to about $1 \times 10^5$ CFU/gm of the respective lactic acid bacteria.

Figure 20:
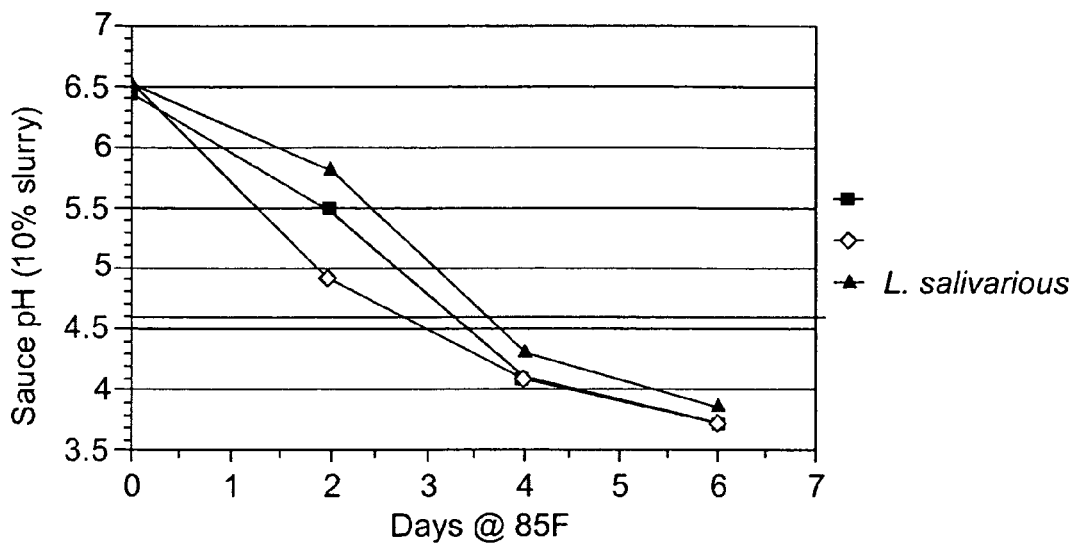
FIG. 20 is a plot of the pH of a 10% slurry of a pasta sauce as a function of the number of days that the pasta sauce was stored at 85° F. for samples inoculated with three different biocontrol starter cultures.

After inoculating the pouches, five pouches inoculated with each strain were stored at 50° F., and five pouches inoculated with each strain were stored at 85° F. Values of the pH were measured for the sauce samples by forming a 10% aqueous sauce solution. The pH was measured every 2 days for samples stored at 85° F., until the pH lowered to a value less than 4.0. The results, each point being an average over two pH measurements for the sample, are presented in FIG. 20. All three strains of bacteria reduced the pH below 4.5 within 4 days of storage at 85° F. After 6 days of storage at 85° F., the pH of the inoculated sauces were less than 4.0.

Figure 21:
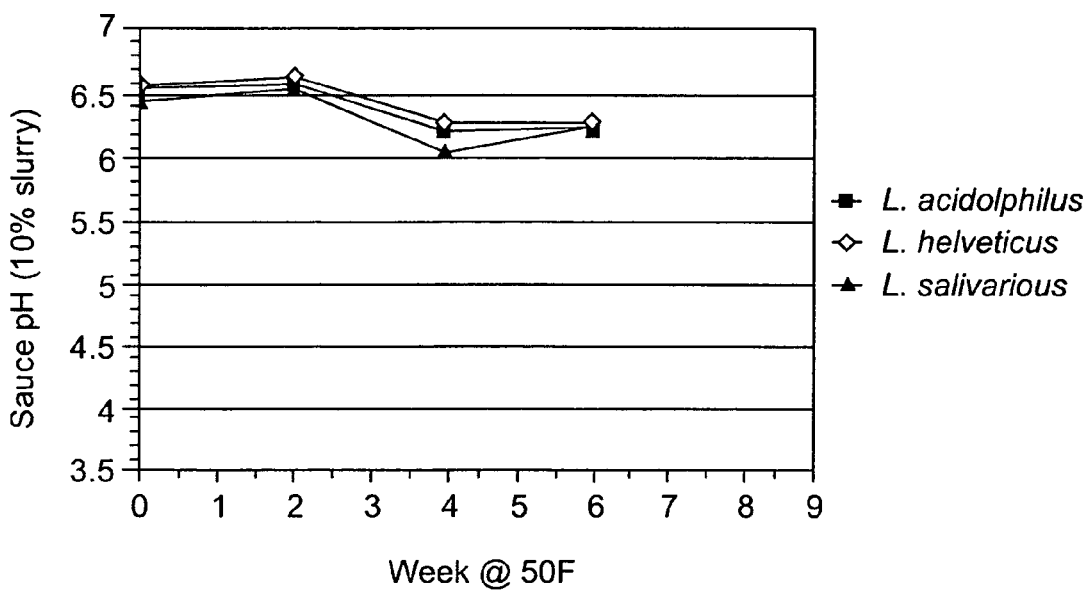
FIG. 21 is a plot of the pH of a 10% slurry of a pasta sauce as a finction of the number of days that the pasta sauce was stored at 50° F. for samples inoculated with three different biocontrol starter cultures.

The pH was measured every two weeks for each sample stored at 50° F. The results, each point being an average over two pH measurements for the sample, are plotted in FIG. 21. After storage for six weeks at 50° F., the pH of the sauces had not changed significantly from the original values.

Although the present invention has been described with reference to preferred embodiments, workers skilled in the art will recognize that changes may be made in form and detail without departing from the spirit and scope of the invention.

The invention claimed is:

1. A food product comprising a pasteurized hydrated, edible food item, said food product being at a temperature state of less than 10° C., wherein said stored food product comprises encapsulated, dormant, hydrated nontoxic microorganisms that are effectively dormant up to temperatures of about 10° C., and wherein, if the food product reaches a temperature above 10° C., said nontoxic microorganisms release by-products into said food product that inhibit the growth of harmful microorganisms.

2. The food product of claim 1 wherein the microorganisms, when no longer dormant, inhibit the growth of toxic microorganisms within the food product by producing an acid, thereby lowering the pH of the food product.

3. The food product of claim 1 wherein the microorganisms comprise a bacteria belonging to a genera selected from the group consisting of *Lactococcus, Streptococcus, Leuconostoc, Pediococcus, Lactobacillus, Bifidobacterium*, and *Propionibacterium*.

4. The food product of claim 1 wherein the microorganisms comprise a bacteria selected from the group consisting of *Pediococcus acidilactici, Lactobacillus bulgaricus, Lactobacillus plantarum, Lactobacillus acidophilus, Lactobacillus helveticus, Lactobacillus salivarious, Leuconostoc citrovorum, Streptoccus cremoris, Streptococcus diacetylactis*, and *Streptococcus lactis*.

5. The food product of claim 1 wherein the microorganisms comprise *Streptococcus thermophilus* bacteria.

6. The food product of claim 1 wherein the microorganisms, when no longer dormant, inhibit the growth of toxic microorganisms within the food product by producing one or more antibiotics.

7. The food product of claim 1 wherein the hydrated, edible food item comprises a liquid.

8. The food product of claim 1 wherein the hydrated, edible food item comprises a sauce.

9. The food product of claim 1 wherein the hydrated, edible food item comprises a filled dough product.

10. The food product of claim 1 wherein the food product after pasteurization is sealed within a container.

11. The food product of claim 1 wherein the encapsulation material comprises a food item.

12. The food product of claim 11 wherein the encapsulation material comprises a fat.

13. The food product of claim 1 wherein the encapsulation material comprises an edible polymer.

14. The food product of claim 1 wherein the encapsulation material forms a sachet.

15. The food item of claim 10 wherein the food product is stored in an anaerobic environment.

16. The food product of claim 1 wherein the edible food item comprises an egg roll.

17. The food product of claim 1 wherein the edible food item comprises filled ravioli.

18. The food product of claim 1 wherein the edible food item comprises juice.

19. The food product of claim 1 wherein the edible food item comprises a dairy product.

20. The food product of claim 2, wherein the food product has an initial pH above 5.4 and comprises nontoxic microorganisms that cause the food product to have a pH of 5.4 within 120 hours at an incubation temperature of 32.2° C.

21. The food product of claim 1 wherein the food product comprises greater then about $10^4$ CFU/gm of the microorganisms.

22. The food product of claim 1 wherein the food product comprises from about $10^6$ CFU/gm to about $10^8$ CFU/gm of the microorganisms.

23. The food product of claim 1 wherein the encapsulation material comprises a methyl cellulose material.

24. The food product of claim 1 wherein the encapsulation material comprises a hydroxy propyl methyl cellulose material.

25. The food product of claim 1 wherein the microorganisms are provided in a freeze dried culture that is formed into a tablet with a hydroxy propyl methyl cellulose material.

26. The food product of claim 1 wherein the microorganisms are provided in a freeze dried culture that is placed within a sachet formed from a hydroxy propyl methyl cellulose material.

27. The food product of claim 1 wherein the encapsulation material dissolves prior to the food product reaching a temperature state above 10° C.

28. The food product of claim 1 wherein the encapsulation material forms a gel that keeps the microorganisms from dispersing when the food product is at temperature below 10° C., and wherein the gel releases the microorganisms when the food product reaches a temperature above about 10° C.

* * * * *